(12) United States Patent
Vasudevan

(10) Patent No.: US 7,720,861 B1
(45) Date of Patent: *May 18, 2010

(54) MULTIMEDIA INSPECTION DATABASE SYSTEM (MIDAS) FOR DYNAMIC RUN-TIME DATA EVALUATION

(75) Inventor: Mark P Vasudevan, Winston-Salem, NC (US)

(73) Assignee: Vasudevan Software Inc., Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/592,447

(22) Filed: Nov. 3, 2006

Related U.S. Application Data

(63) Continuation of application No. 10/911,368, filed on Aug. 4, 2004, now Pat. No. 7,167,864, which is a continuation of application No. 09/903,506, filed on Jul. 13, 2001, now Pat. No. 6,877,006.

(60) Provisional application No. 60/219,186, filed on Jul. 19, 2000.

(51) Int. Cl.
*G06F 7/00* (2006.01)
*G06F 17/30* (2006.01)

(52) U.S. Cl. .................. 707/770; 707/805; 715/762

(58) Field of Classification Search .......... 707/1–10, 707/100–104.1, 200–206; 715/700, 737, 715/743, 762, 782
See application file for complete search history.

(56) References Cited

U.S. PATENT DOCUMENTS

| | | | |
|---|---|---|---|
| 5,088,052 A * | 2/1992 | Spielman et al. ............ | 715/804 |
| 5,448,696 A | 9/1995 | Shimada et al. | |
| 5,638,523 A | 6/1997 | Mullet et al. | |
| 5,767,854 A | 6/1998 | Anwar | |
| 5,808,613 A | 9/1998 | Marrin et al. | |
| 5,883,628 A | 3/1999 | Mullaly et al. | |
| 5,886,700 A | 3/1999 | Di Pippo et al. | |
| 5,905,985 A | 5/1999 | Malloy et al. | |
| 5,918,232 A | 6/1999 | Pouschine et al. | |
| 5,940,818 A | 8/1999 | Malloy et al. | |
| 5,943,668 A | 8/1999 | Malloy et al. | |
| 5,964,835 A | 10/1999 | Fowler et al. | |
| 5,978,788 A * | 11/1999 | Castelli et al. .................. | 707/2 |

(Continued)

OTHER PUBLICATIONS

Theodore Johnson et al., Extending complex ad-hoc OLAP, Nov. 1999, ACM, 170-179.*

(Continued)

*Primary Examiner*—Jean B Fleurantin
(74) *Attorney, Agent, or Firm*—Edmonds & Nolte, PC

(57) ABSTRACT

An object-oriented system provides a comprehensive and integrated tool to manage, operate, analyze and inspect structures by providing 3-D visualization of the structures, a database interface, connectivity with one or more databases, a data display and analysis capabilities. The structural model is stored as an object-oriented, serialized file as a series of objects, including primitives, coordinates, object names, group names and other object identifiers. The system integrates various types of data, including tabulated textual data, annotated engineering drawings, photographic records, graphical plots, audio and videotaped records, from different tables and databases. Data are displayed to the user based on queries that the user submits to the system, which queries are evaluated at run-time. As a result, the user achieves unparalleled flexibility in data analysis and evaluation.

4 Claims, 22 Drawing Sheets

U.S. PATENT DOCUMENTS

| | | | |
|---|---|---|---|
| 5,999,165 | A | 12/1999 | Matsumoto |
| 6,014,142 | A | 1/2000 | LaHood |
| 6,031,536 | A | 2/2000 | Kamiwada et al. |
| 6,064,389 | A | 5/2000 | Berry et al. |
| 6,094,651 | A | 7/2000 | Agrawal et al. |
| 6,122,628 | A | 9/2000 | Castelli et al. |
| 6,134,541 | A | 10/2000 | Castelli et al. |
| 6,161,103 | A | 12/2000 | Rauer et al. |
| 6,189,004 | B1 | 2/2001 | Rassen |
| 6,253,203 | B1 | 6/2001 | O'Flaherty et al. |
| 6,430,565 | B1 | 8/2002 | Berger et al. |
| 6,434,544 | B1 * | 8/2002 | Bakalash et al. ............... 707/2 |
| 6,516,324 | B1 | 2/2003 | Jones et al. |
| 6,546,381 | B1 | 4/2003 | Subramanian et al. |
| 6,549,907 | B1 | 4/2003 | Fayyad et al. |
| 6,581,068 | B1 | 6/2003 | Bensoussan et al. |
| 6,604,110 | B1 | 8/2003 | Savage et al. |
| 6,768,986 | B2 | 7/2004 | Cras et al. |
| 6,877,006 | B1 | 4/2005 | Vasudevan |
| 7,167,864 | B1 | 1/2007 | Vasudevan |
| 2004/0128276 | A1 | 7/2004 | Scanlon et al. |

OTHER PUBLICATIONS

,Surajit Chaudhuri et al., An overview of data warehousing and OLAP technology, Mar. 1997, 65-74.*

*Notice of Intent to Issue Reexamination Certificate*, Reexamination Control U.S. Appl. No. 90/008,440, filed Sep. 30, 2008.

IBM DB2 DataJoiner, "Administration Supplement," Version 2, Release 1, Modification 1, Jul. 1998, 205 pages.

IBM DB2 DataJoiner, "Application Programming and SQL Reference Supplement," Version 2, Release 1, Modification 1, Jul. 1998, 247 pages.

Maria Sueli Almeida, et al., IBM "Getting Started with Data Warehouse and Business Intelligence," Aug. 1999, 260 pages.

Jim Gray, et al., "Data Cube: A Relational Aggregation Operator Generalizing Group-By, Cross-Tab, and Sub-Totals," Microsoft Technical Report MSR-TR-95-22, Revised Nov. 18, 1995, 8 pages.

Shivakumar Venkataraman and Tian Zhang, "Heterogeneous Database Query Optimization in DB2 Universal DataJoiner," Proceedings of the 24th VLDB Conference, New York, USA, 1998, 5 pages.

Frederic Gingras and Laks V.S. Lakshmanan, "nD-SQL: A Multidimentional Language for Interoperability and OLAP," Proceedings of the 24th VLDB Conference, New York, USA, 1998, 12 pages.

Laura M. Haas, et al., "Optimizing Queries across Diverse Data Sources," Proceedings of the 23rd VLDB Conference, Athens, Greece, 1997, 10 pages.

IBM DB2 Universal Database, "SQL Reference," Version 5.2 Copyright IBM Corp. 1993, 1998, 51 pages.

Sean Johnson, "A Technical Tour of IBM WebSphere Information Integrator Content Edition" Feb. 2005, pp. 1-25.

Anjali Betawadkar-Norwood et al, "Using Data Federation Technology IBM WebSphere Information Integrator: Data Federation Design and Configuration" Jun. 23, 2005, pp. 1-18.

IBM DB2 Datajoiner, Version 2.1—Data Access for IBM and Non-IBM Relational Databases, Software Announcement, Sep. 16, 1997, 46 pages.

Olivier Bonnet et al, "My Mother Thinks I'm a DBA! Cross-Platform, Multi-Vendor, Distributed Relational Data Replication with IBM DB2 DataPropagator and IBM DataJoiner Made Easy!" in http://www.redbooks.ibm.com, Jun. 1999, pp. 1-434.

Kamel, et al. "The Federated Database Management System: An Architecture of Distributed Systems for the 90's" in IEEE Xplore, 1990, pp. 346-352.

Sheth et al. "Federated Database Systems for Managing Distributed, Heterogeneous, and Autonomous Databases" in ACM Computing Surveys, vol. 22, No. 3, Sep. 1990, pp. 183-236.

Barbancon, et al. "Implementing Federated Database Systems by Compiling SchemaSQL" in Proceedings of the International Database Engineering and Applications Symposium, 2002, 10 pages.

Heimbigner, et al. "A Federated Architecture for Information Management" in ACM Transactions on Office Information Systems, vol. 3, No. 3, Jul. 1985, pp. 253-278.

Soutou, "Towards a Methodology for Developing a Federated Database System" in IEEE Xplore, 1993, pp. 560-564.

Chawathe, et al. "The TSIMMIS Project: Integration of Heterogeneous Information Sources" Department of Computer Science, Stanford University, 12 pages, Oct. 1994.

* cited by examiner

MULTIMEDIA INSPECTION DATABASE SYSTEM (MIDAS) FOR DYNAMIC RUN-TIME DATA EVALUATION

CROSS REFERENCE TO RELATED APPLICATIONS

The present patent application is a continuation of U.S. patent application Ser. No. 10/911,368, filed on Aug. 4, 2004, now U.S. Pat. No. 7,167,864 which is a continuation of U.S. patent application Ser. No. 09/903,506, filed on Jul. 13, 2001, now issued as U.S. Pat. No. 6,877,006, which claims the priority benefit of U.S. Provisional Application Ser. No. 60/219,186, filed on Jul. 19, 2000. The provisional application, in its entirety, is hereby incorporated by reference.

FIELD OF THE INVENTION

This invention relates to information systems. Specifically, this invention relates to inspection information systems for evaluating structures that provide data query and update capabilities.

BACKGROUND OF THE INVENTION

The high cost of analyzing and inspecting structures on a regular basis to ensure structural integrity has plagued industries that rely on the soundness of these structures. Structures such as buildings, oil rigs, aircraft and the like require periodic analyses and inspections to uncover potential weaknesses that endanger the safety of the personnel who use these structures.

However, when periodic analyses and inspections are conducted, large amounts of data are generated, and a need arises to collate and correlate the data to assess the structure effectively. The data analysis is typically complex because it involves multiple key parameters, spanning different tables across various databases. In addition, various data formats are used to present data, including tabulated text data, annotated engineering drawings, photographic records, graphical plots, audio and videotaped records.

Current software offerings only provide a single set or dimension of correlated and collated data at a time. Data are usually presented in a two dimensional grid, and as a result, the user has to look at the correlated data in piecemeal fashion, i.e., one set of correlated data presented in one grid at a time.

In addition, another problem presented by current software products is the lack of flexibility in querying data. While current software products can perform complex collation and correlation of data derived from a large and disparate set of databases, the databases have to be pre-configured at the design-time of the information systems. For example, a pre-configured query may provide the user with information that correlates parts in an aircraft with the respective part number from the part manufacturer. However, unless the relevant databases have been pre-configured at design-time, the user will be unable to obtain information that correlates parts in an aircraft with the respective repair history for each part. Thus, a user cannot reorient the data with respect to a new criterion or a new database that is not known and selected in the design phase of the information system. As a result, the user is unable to perform ad-hoc querying at run-time.

Furthermore, current software products do not allow the user to update the correlated data from the data display. Instead, current software products provide a pre-processed display form of the data in a database, and any updates to the data must be applied directly to the database, rather than through the pre-processed display form of the data presented to the user.

For example, the user may be presented with a pre-processed grid that shows the parts of an aircraft, correlated to the respective inventory level for each part of the aircraft. If the user decides to update the inventory level for a specific part, the user cannot simply update the pre-processed grid that shows the correlated data. Instead, the user has to gain access to the original source database that supplies the inventory data, and update that database as necessary. Another database has to be constructed and populated to track and store both the history of the correlated data and the decisions that are made as a result of this secondary data analysis. In addition, to view the updated data for the specific part, the pre-processed grid has to be recreated before the updated inventory data can be presented to the user.

Another problem presented by current software products is the need to purchase analysis tools to supplement the capability of current database applications. As a result, the cost and complexity of analyzing data increases as the number of analysis tools increases.

Furthermore, yet another weakness of current software products is their reliance on textual input from the user to select the relevant structural components to be analyzed. For example, when a user wishes to analyze the wing component of an aircraft, the user is limited to making a selection through a text-based system to select the wing component from a keyword list consisting of all the components in the aircraft. If more specific components need to be analyzed, such as a sub-component of the wing component, the user will have to know the exact text keyword that the software product has assigned to the component. Such a text-based system requires re-training of the user on the software product, leading to additional costs and loss of productivity.

Hence, a frustrated need exists to integrate data in structural analyses and inspection databases, some of which may be legacy systems, into a comprehensive database for the assessment of structural and operational integrity.

SUMMARY OF THE INVENTION

The present invention, for the first time, assembles an OLAP (online analytical processing) view of data (i.e., an OLAP cube) at run time, in response to a data query by a user, by accessing a plurality of incompatible source databases.

Also, for the first time, the user may directly update the source databases directly to from the user's GUI display of the OLAP cube which also updates the OLAP cube.

Also, the present invention permits entire source databases to be added to or removed from the universe of source databases.

Also, a hierarchy of user access and data update authorization is enabled by the present invention.

This is distinct from the prior art, which may build a single static OLAP data cube in the design phase of the information system, then access it in response to user queries. This, of course, has no ability to update the source databases from the user display of the query results and no ability to alter the OLAP cube by adding or deleting source databases.

The present invention may be accessed through the Internet, by a remote GUI on a thin client computer, which accesses a powerful central server. The central server may then access the plurality of source databases, either locally or remotely, which may be accessed directly or through other database servers and information systems. The central server may link to any legacy source database, to develop updatable OLAP data cubes, in response to user queries. Data can be accessed and taken from, and updated to, any database type, including SQL, relational, object oriented, multi-dimensional, and flat databases.

The present invention further permits the integration of all aspects and information pertaining to the management, operation, analysis and inspection of structures by correlating multiple key parameters 635 spanning multiple tables across several databases 605. This feature provides users with unparalleled flexibility in developing queries 1215 to evaluate data in database 605.

The present invention provides integration of several types of structure data 630, such as tabulated textual data, annotated engineering drawings, photographic records, and graphical plots including Virtual Reality Modeling Language (VRML) files, as well as audio and videotaped records.

Furthermore, the present invention provides access to the data 630 using a graphical user interface (GUI) 205 that uses a natural mode of operation and which requires little or no retraining. The present invention makes extensive use of graphical metaphors such as 3-D visualization 105 of the structure, and the display of primary information 810 along with correlated information 815, that mimics the way in which structural evaluation is carried out in current practice.

In addition, the present invention adapts to any structure and associated management, operation, analysis and inspection activities. For example, the present invention provides the same functionality and capabilities to users in the aerospace and defense industries that are provided to users in the oil and gas industries. The first group may manage information on an aircraft, while the second group may manage information regarding an offshore oil platform. The present invention provides a customizable definition of data elements 615 and types of data 630 among various databases 605 to achieve adaptability among different users.

It is a further object of the invention to handle information for more than one structure at a time. Structural management often involves multiple structures grouped into generic classes (e.g. different aircraft models of the generic class passenger airliner may include both the Boeing 737 and the McDonnell Douglas DC 10). By providing a tabulated trend analysis 1610 and a graphical trend analysis 1815, the present invention provides a powerful tracking mechanism for common problems, detected defects and trends.

DETAILED DESCRIPTION OF THE DRAWINGS AND PREFERRED EMBODIMENTS

Figure 1:
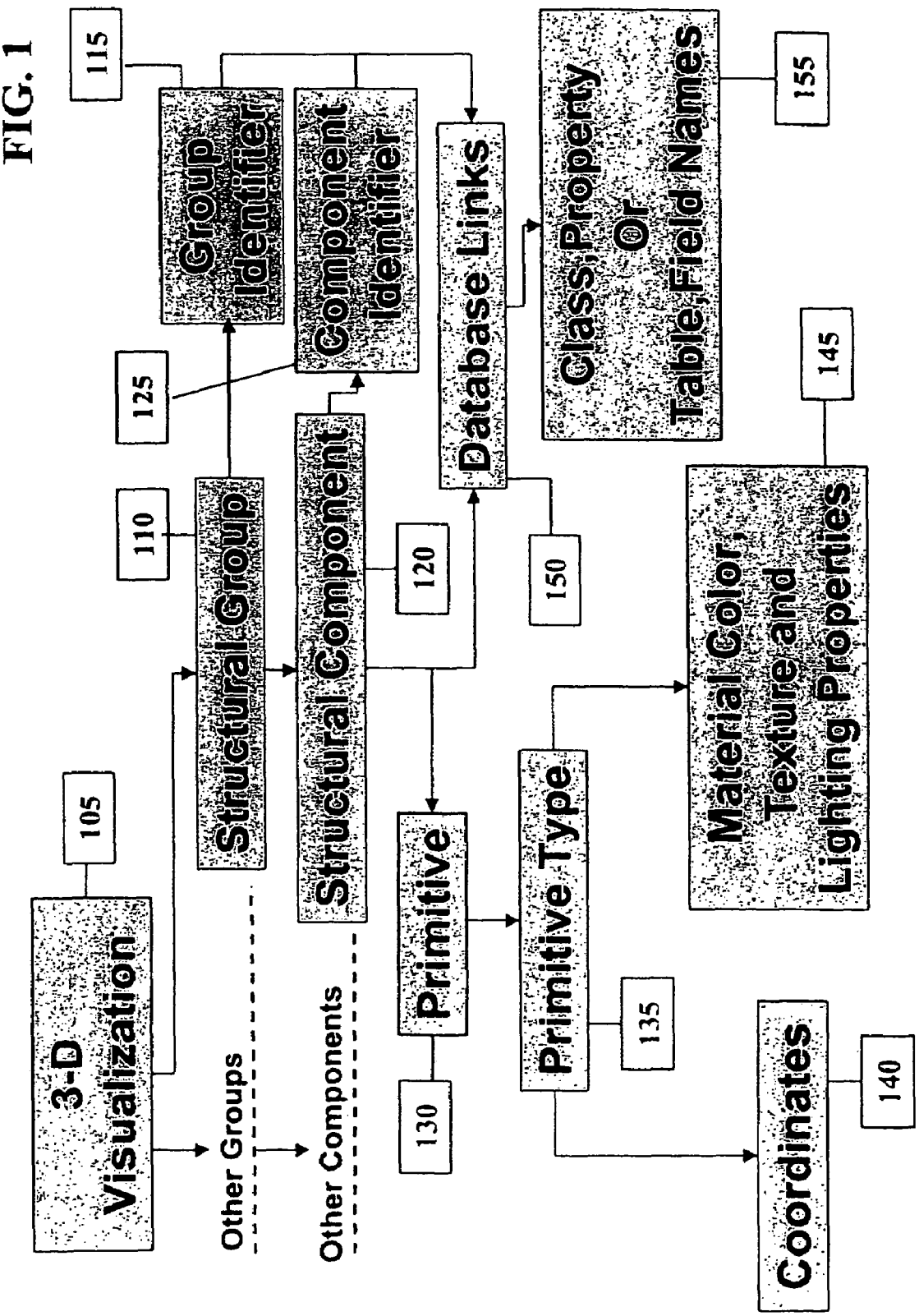
FIG. 1 is a structured layout of a 3-D visualization in an embodiment of the present invention.
Figure 4:
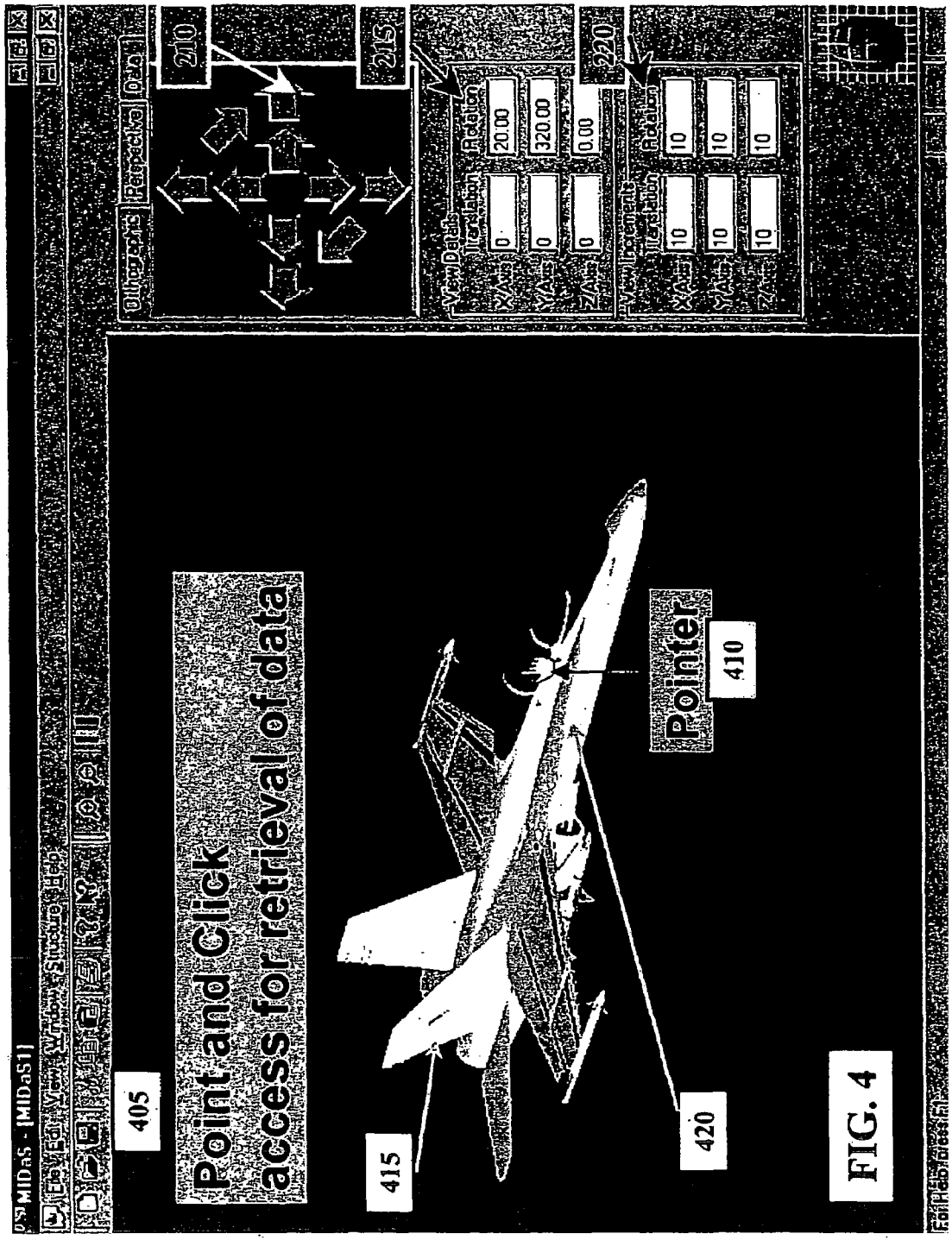
FIG. 4 shows a display with point and click access in an embodiment according to the present invention.

One of the objectives of the present invention is to facilitate easy access to the data elements. To achieve this objective, the present invention uses 3-D visualization to provide the user with a familiar structure to gain access to the data elements. In a preferred embodiment of the invention depicted in FIG. 1, known as MIDaS, a 3-D visualization file 105 is provided to define a structural group 110 that identifies the classification that encompasses a structure 415, an example of which is shown on FIG. 4. Thus, each structure 415 is assigned a structural group 110. For example, a fighter jet may be classified in the structural group 110 that also comprises commercial airplanes and helicopters. The structural group 110 is assigned a group identifier 115. In the example given earlier, the fighter jet may be assigned to the structural group 110 with the group identifier 115 of "AIRCRAFT."

In addition to assigning a structural group 110 to a given structure, the 3-D visualization module 105 also provides the ability to identify structural components 120, which are the basic building blocks of any structure 415. These structural components 120 are identified by component identifiers 125. In the example above, the fighter jet may be further defined into interior and exterior components. One of the structural components 120 may have a component identifier 125 of "WING", while another structural component 120 may have a component identifier 125 of "TAIL".

In one embodiment, comprehensive 3-D visualization is achieved using OpenGL graphics and modeling libraries from Silicon Graphics of Mountain View, Calif. The structure is modeled using discrete graphical primitives 130, such as triangles, cylinders, spheres and rectangular plates. Each primitive 130 is further characterized by a primitive type 135. Each primitive type 135, in turn, is defined by its coordinates 140 and properties 145, including material color, texture and lighting properties.

The structural model is then stored as an object-oriented, serialized file (not shown) as a series of objects, including the primitives 130, coordinates 140, object names, group names and other object identifiers. The object identifiers 155 may include class names and properties (if used in conjunction with an object database) or table and field names (if used in conjunction with a relational database). These identifiers 155 link the graphical representation of the structural components 120 to the analysis and inspection data through database links 150. During execution of the program, the serialized file is read and the various objects are instantiated. The model is then displayed as a series of indexed objects.

An orthographic projection (FIG. 2) and a perspective projection (FIG. 3) are provided to enable comprehensive visualization of the structure. As a result, the user can have realistic views of the structure that mimic the views that the user will have when walking around the actual structure.

Figure 2:
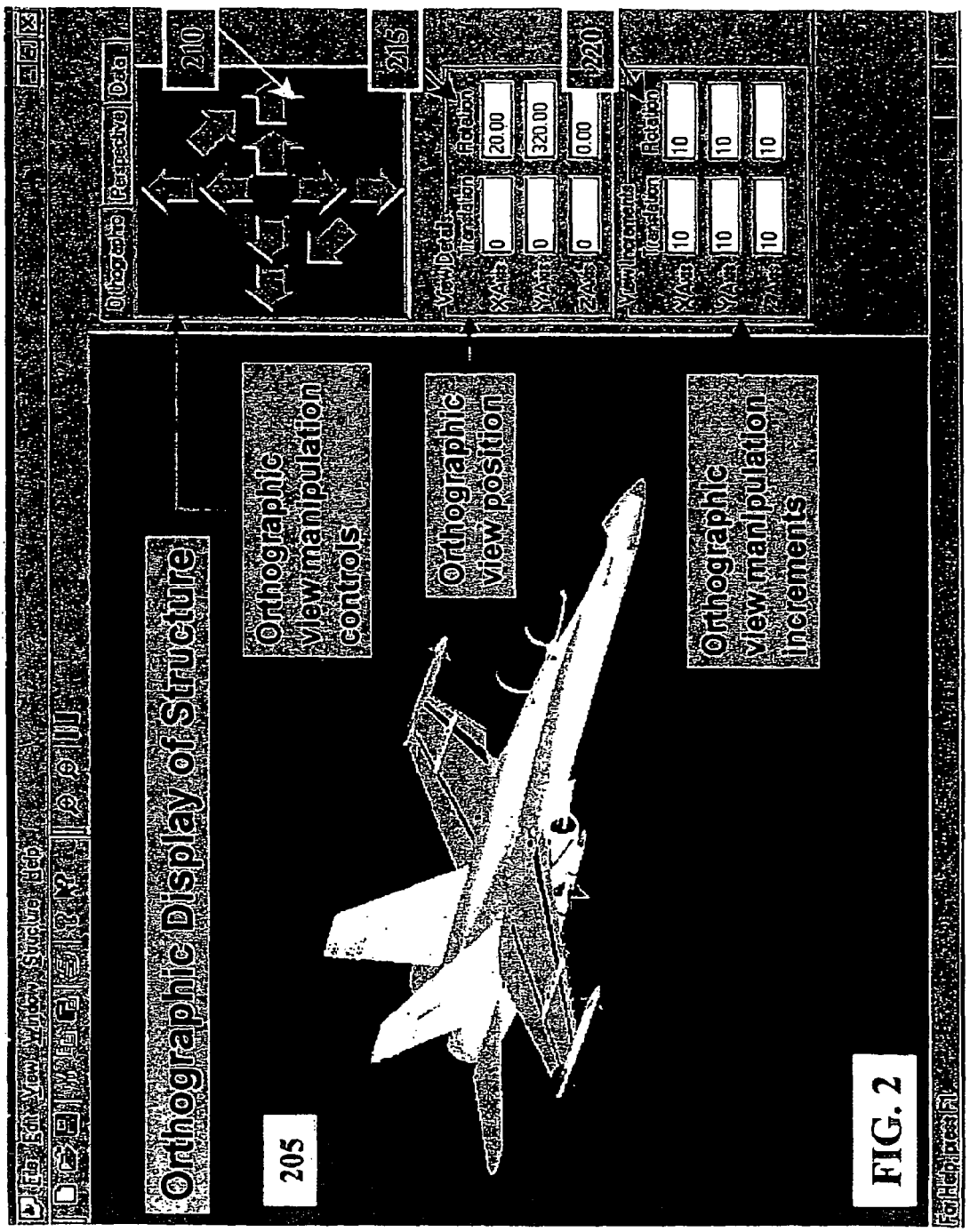
FIG. 2 is an illustration of an embodiment of an orthographic display of a structure according to the present invention.
Figure 3:
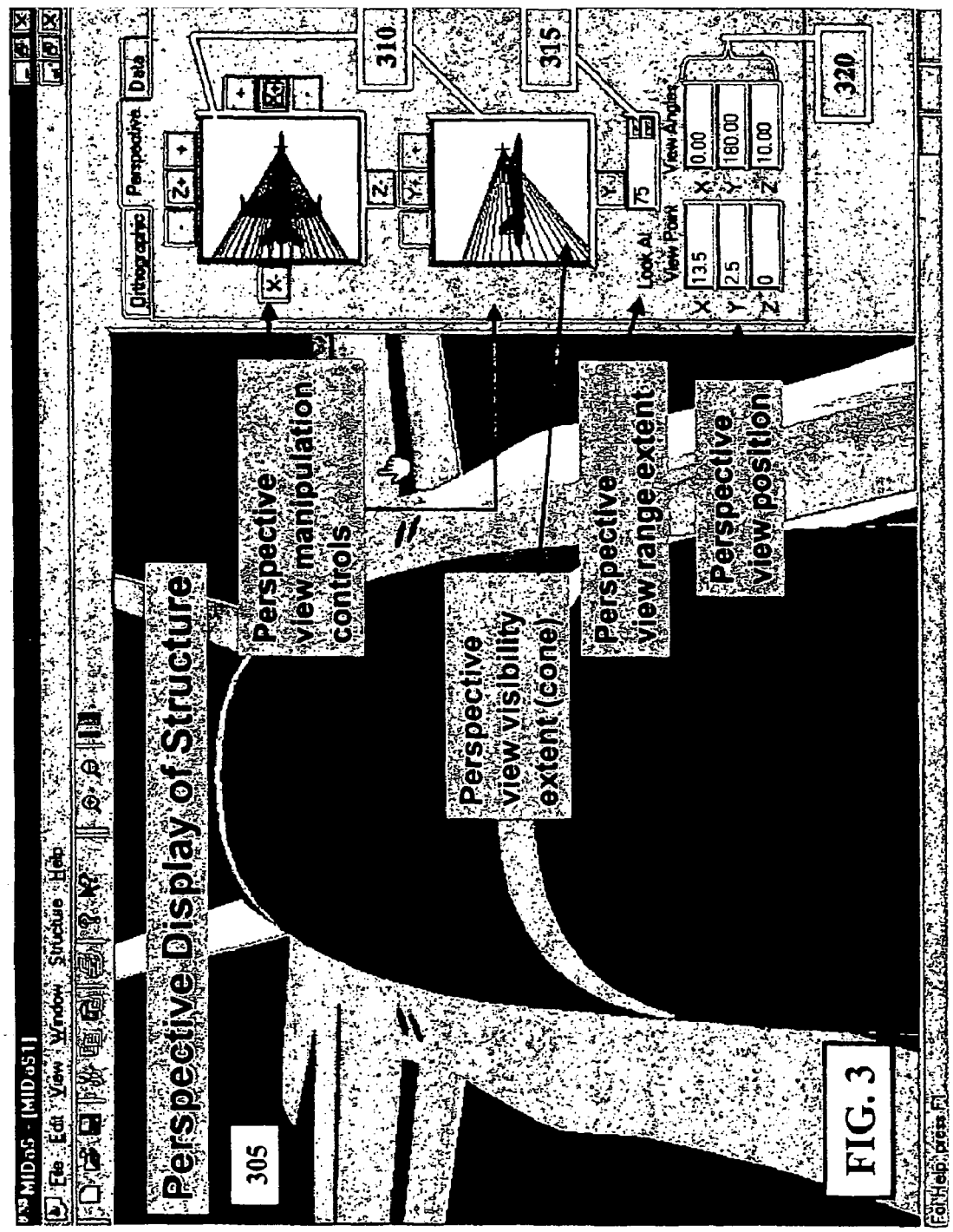
FIG. 3 is an illustration of an embodiment of a perspective display of a structure according to the present invention.

In FIGS. 2 and 3, controls 210 and 310 are provided on the displays 205 and 305, respectively, that allow motion in all six degrees of freedom (X, Y, and Z axes, and rotations about each of the axes). In addition, there are zoom controls 215, 220 and 315. A perspective view position guide 320 is provided to control the view point and view angle with respect to each of the X, Y, and Z axes. Also, the user can partition the view to display plan, elevations and sectional views of the structure. In this way, the user can graphically drill-down and access the structural components 120 of interest or relevance. The colors of each structural component 120 can also be varied. In this way, the results of any subsequent database queries can act as a color code for the display of data.

Figure 5:
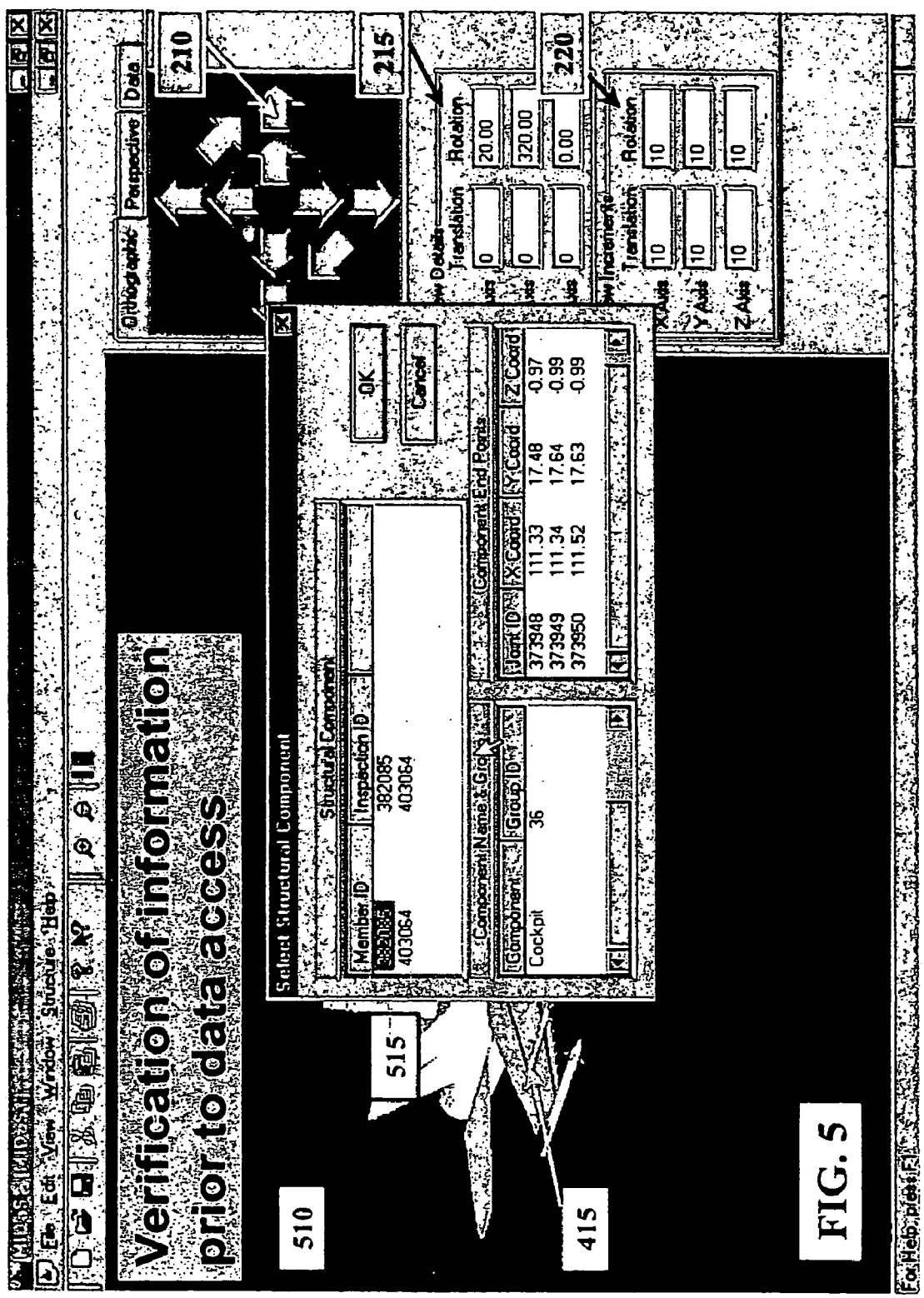
FIG. 5 is an illustration of verifying information prior to data access according to the present invention.

The present invention is designed to provide access to data by clicking on the structural component 120 of interest. Using the mouse as an accessor mechanism, screen coordinates of the mouse click are tracked and are used to retrieve the index of the primitive 130 that was clicked. This index is then used to retrieve the object properties that are subsequently used to link to the database 605. For example, in FIG. 4, an illustrative display 405 shows the pointer 410 positioned on a visual representation of an aircraft 415. By clicking on a structural component 120, of which the cockpit 420 is an example, information about the cockpit 420 is displayed. If the click was positioned at the boundary of two structural components 120, the application returns a selection window 510, as shown on FIG. 5, displaying the two components for selection. The user selects the desired structural component 120 from among the entries in the list 515, and the application displays the relevant data for the selected structural component 120.

Figure 6:
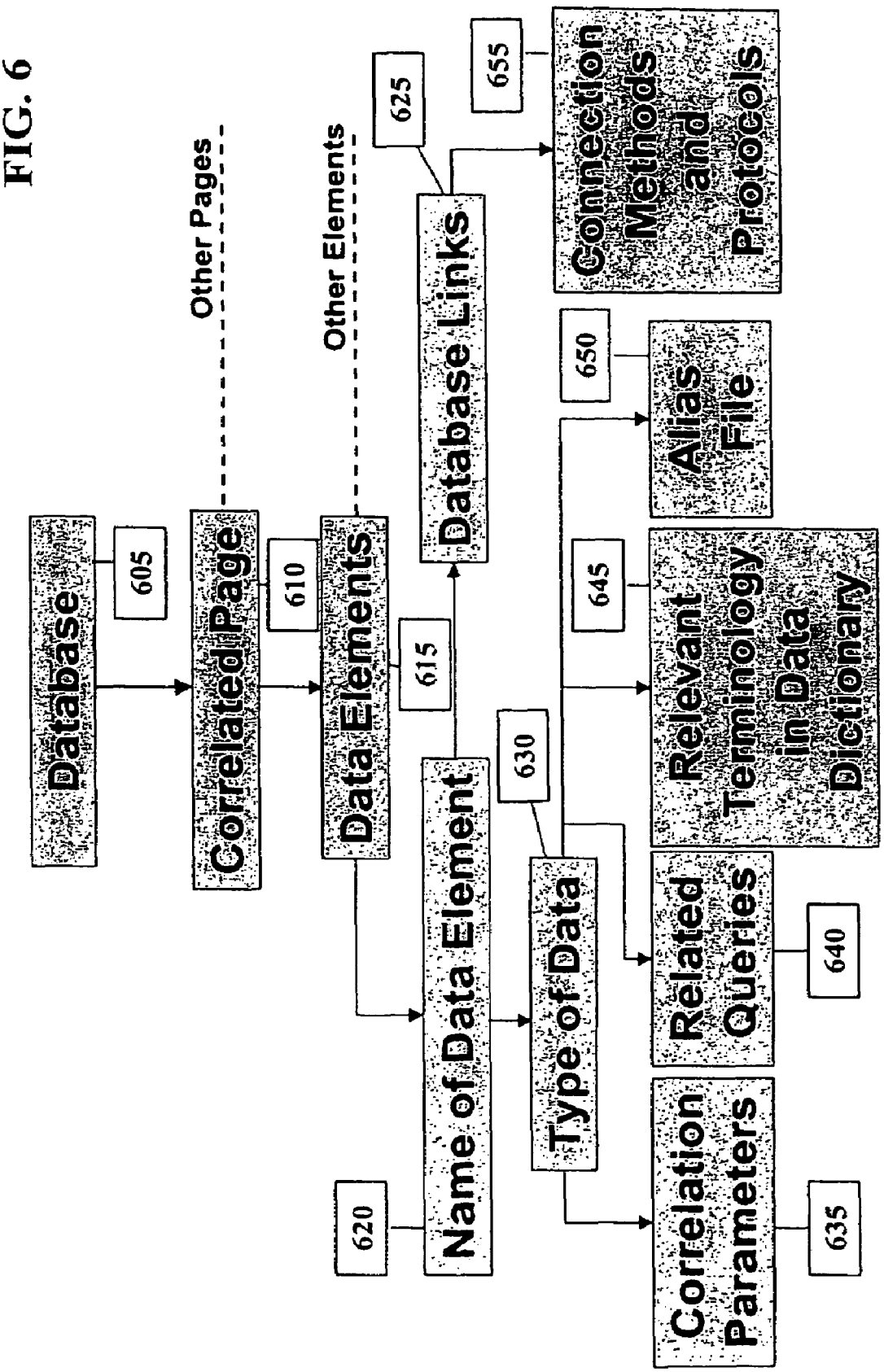
FIG. 6 is a structured layout of a database interface according to the present invention.

FIG. 6 shows a block diagram of the database interface according to an embodiment of the present invention. A serialized file linked to the 3-D visualization file 105 facilitates the interface to the database 605. This file categorizes data into distinct pages 610. Each of these pages 610 defines the data elements 615 that are to be contained within the categorized page 610. These definitions are comprised of the data element name 620, the type of data 630, the source of the data element, and the way in which to display the data elements (e.g. edit box, drop-down list, combo box, etc.) In addition, these definitions also include references to the relevant data dictionary 645. Where the data elements 615 refer to the result of a query 640 on the database 605, the syntax of the query 640 is also defined. The definitions also include correlation and collation definitions and associated parameters 635.

In this embodiment of the present invention, data are classified into specific categories or pages 610. Each category can contain data elements 615 from different data sources, or alternatively, each category may contain the result of queries 640 across different data sources that are correlated according to a relevant parameter 635. Where queries 640 are defined, these queries 640 are executed during the display of the data in an associated page or pages 610.

Where the above definitions involve multiple different data sources (e.g. relational and object database), each of the data element definitions also include details on the database links 625, as well as the connection method and connection protocols 655. Where necessary, in order to facilitate common terminology across different legacy or external databases, an alias file 650 is referenced. During the assembly of the view, this alias file 650 is used to map the terminology of the legacy database to match the common vocabulary contained in the relevant data dictionary 645. Thus, by using the page metaphor, the classification of the relevant types of data is greatly simplified. The use of the page metaphor also enables a structured view of all relevant information in a collated and correlated mariner. In addition, data from different data sources or databases can be combined into a more coherent and easily understandable display of information.

Due to the diverse type of data that MIDaS may be required to access, such as photographic records, textual data, annotated engineering drawings, graphical plots and audio and videotaped records, the capability of the database to store native forms of data is important. A number of commercially available relational databases possess the capability of storing this data as binary large objects (BLOBS). These databases are suitable for this invention.

However, due to the object-oriented design of MIDaS, it is preferred that the type of the database 605 used for primary storage be an object database, such as Jasmine from Computer Associates of Islandia, N.Y. An object database allows a more effective coupling between the data definitions and data access performance between MIDaS the database. The use of an object database affects key items such as geometric and media-based data that is the starting point for the data access (i.e. between the 3-D graphical visualization 105 of the structure and the database 605). Certain object databases can store or bind the object database to external relational databases. In these cases, MIDaS will utilize these bindings directly by a corresponding reference in the serialized database interface. In essence, this means that a unified object model is used for the visualization, database interface and data storage. This also leads to quicker application performance.

Nevertheless, while an object database is preferred, legacy relational databases may be used as data stores or as sources of information available to MIDaS. Indeed, the database interface, through the use of OLE-DB connections, facilitates the use of legacy relational databases.

Figure 7:
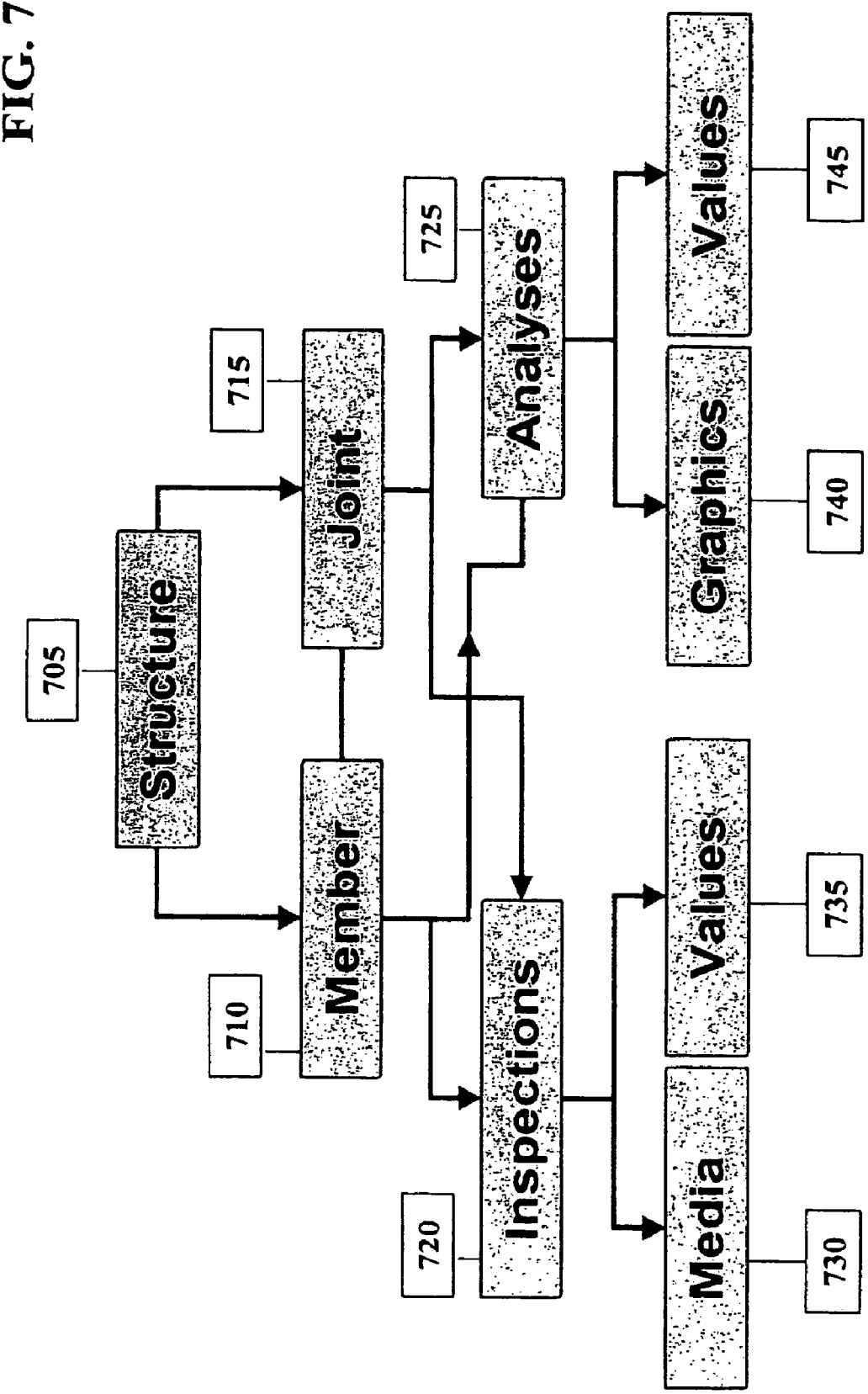
FIG. 7 is an illustration of an object-oriented class definition for the analyses and inspection data according to the present invention.

FIG. 7 is an illustration of an object oriented class definition for the analyses and inspection data for an offshore oil platform. The structure 705 is classified into 2 classes, member 710 and joint 715. Each of member 710 and joint 715 may have inspections 720 and/or analyses 725 associated with it. If inspection 720 data are desired for the offshore oil platform, the data may consist of media 730 data, such as audiotaped data, or values 735, such as tables of information stored in a database. If analyses 725 data are needed for the offshore oil platform, the data may consist of graphics 740 data, such as photographs, or values 745 data, such as numbers and text.

In one embodiment of the invention, two different connection methods and connection protocols are available. One is Microsoft Corporation's OLE-DB technology. This technology allows access to most databases 605. The second method of connection utilizes the native connection method to the database 605, for example for object databases. This will be the object database vendor's recommended native connection methods and protocols 655. Using these connection methods and protocols 655, the required network topology and connectivity are managed by the operating system, or alternatively, by Internet protocols where MIDaS is required to utilize an Internet connection.

By making the two connection methods and connection protocols 655 available, the capabilities of MIDaS are expanded to encompass data that are stored in the main database 605, as well as other legacy or related databases storing information relevant to the structure and related processes. In addition, by using the above connection methods and connection protocols, the functionality of MIDaS is extended to other databases 605, unlike current software packages that require a single contiguous database to store all the information pertaining to the structure and its associated processes.

Figure 8:
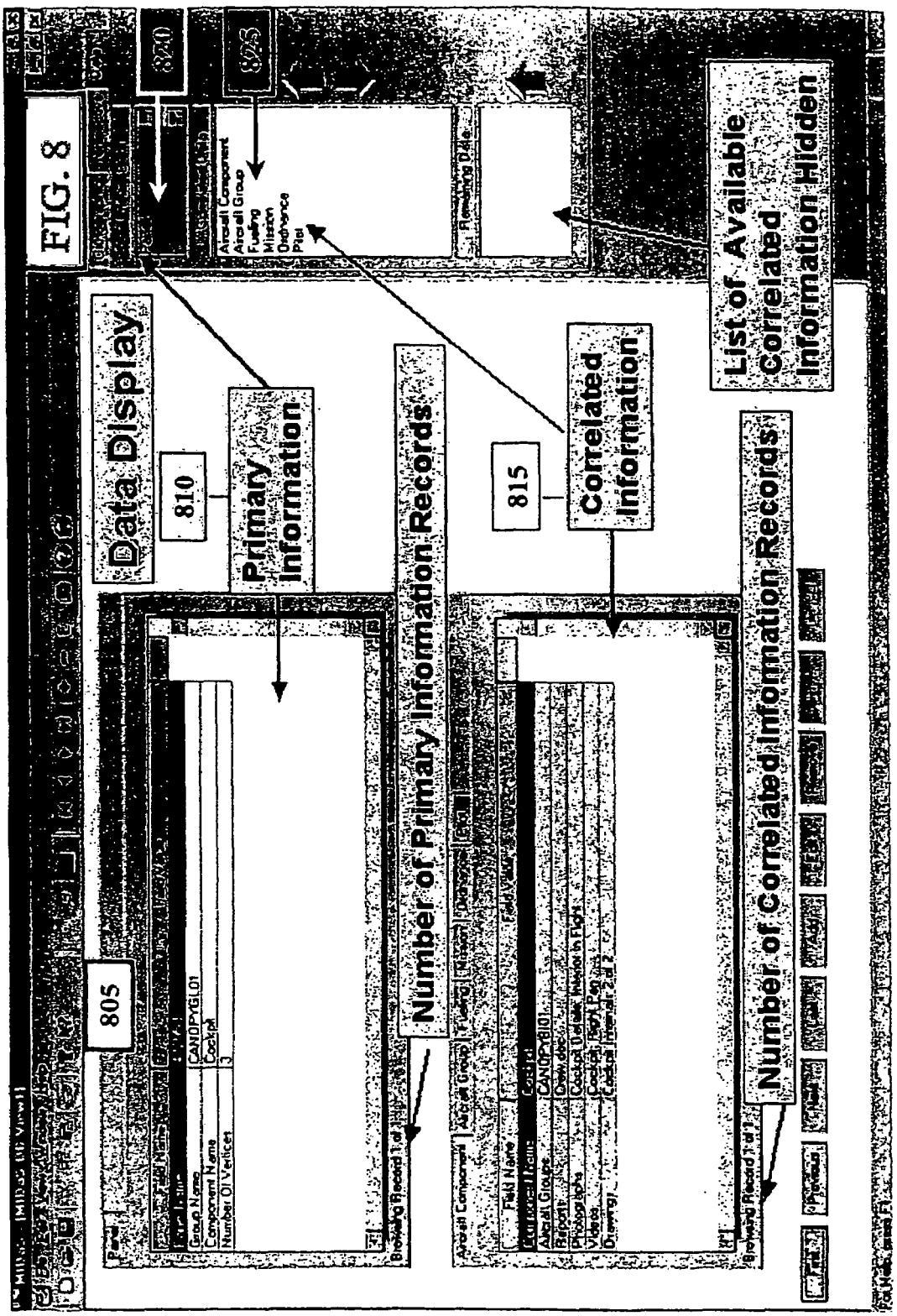
FIG. 8 is an illustration of a data display according to the present invention.

FIG. 8 is a data display according to the present invention. The display of data is paramount to the original and unique method of operation of MIDaS's handling of data from the database 605. In one embodiment, the display 805 has two parts, the primary information 810 and the correlated information 815. The primary information 810 consists of a single page 820. The database 605 is oriented to the perspective or axis of the classification denoted by the page 820 (and defined in the serialized file of the database interface). The correlated information 815 consists of a set of pages 825 that are relevant to the information contained in the primary page 820. In other words, MIDaS correlates all data related to the component 120 shown on the primary page 820 and presents them as a set of pages 825. MIDaS further classifies the correlated data 815 according to the classifications, definitions and operations defined in the serialized file of the database interface. Essentially, this means that MIDaS is performing a user-defined multi-dimensional sort/analysis of the data at runtime using the definition of the primary information 810 in the serialized database interface as a compass for the operations.

The serialized file contains the data sources 605, categories or pages 610 as well as the collation and correlation definitions and associated correlation parameters 635 for the individual data elements 615. When the primary information 810 or the perspective for the display 805 is set, the correlation definitions for the selected primary information 810 are defined as a collection of corresponding correlation parameters 635 and associated values. Each of the assembled definitions essentially acts as a query. These correlation definitions are used as input parameters 635 to search each of the data sources 605 associated with each of the correlated information categories or pages 825. In each displayed page in the correlation information section 815, the most relevant correlation parameter 635 from the collection corresponding to the primary information 810 is matched and then selected from the set of available correlation parameters 635 for the correlation page 610. This matched definition is in turn used as a query or search in the associated data sources 605 for the page 610. The results of these searches are displayed as the contents of each field in each page 825 of the correlated information 815. This functionality is available as part of the capabilities of MIDaS without resorting to any third party tools.

For example, in FIG. 8, the primary information 810 displays the panel details for Panel 402958. MIDaS assembles the set of correlation parameters 635 (e.g. Panel Name=402958, Group Name=CANOPYGLO1, Component Name=Cockpit etc.). MIDaS utilizes the Component Name (with a value of "COCKPIT") to assemble the set of data for the displayed correlated information 815, namely the Aircraft Component Page. If the displayed correlated information page 825 were Aircraft Group, the selected correlation parameter 635 would be Group Name (with a value of "CANOPYGLO1").

In the above examples, the correlation parameters 635 and values are one of the displayed fields. It is also possible to define correlation parameters 635 based on fields that are not displayed but are the results of queries on other data sources. These query results would be assembled as part of the set of correlation definitions (corresponding correlation parameters and associated values). For example, the Aircraft Tail Number or identifier of the aircraft when Panel is the displayed primary information 820 is determined from an associated data source 605 called Catalog. Catalog associates each unique Panel Name with one or more Aircraft Tail Numbers. As a result, when Mission or Ordnance is the displayed correlated information page 825, the relevant set of information for the associated page is assembled from a query defined from this query (i.e. Aircraft Tail Number=VFA81-414).

Figure 9:
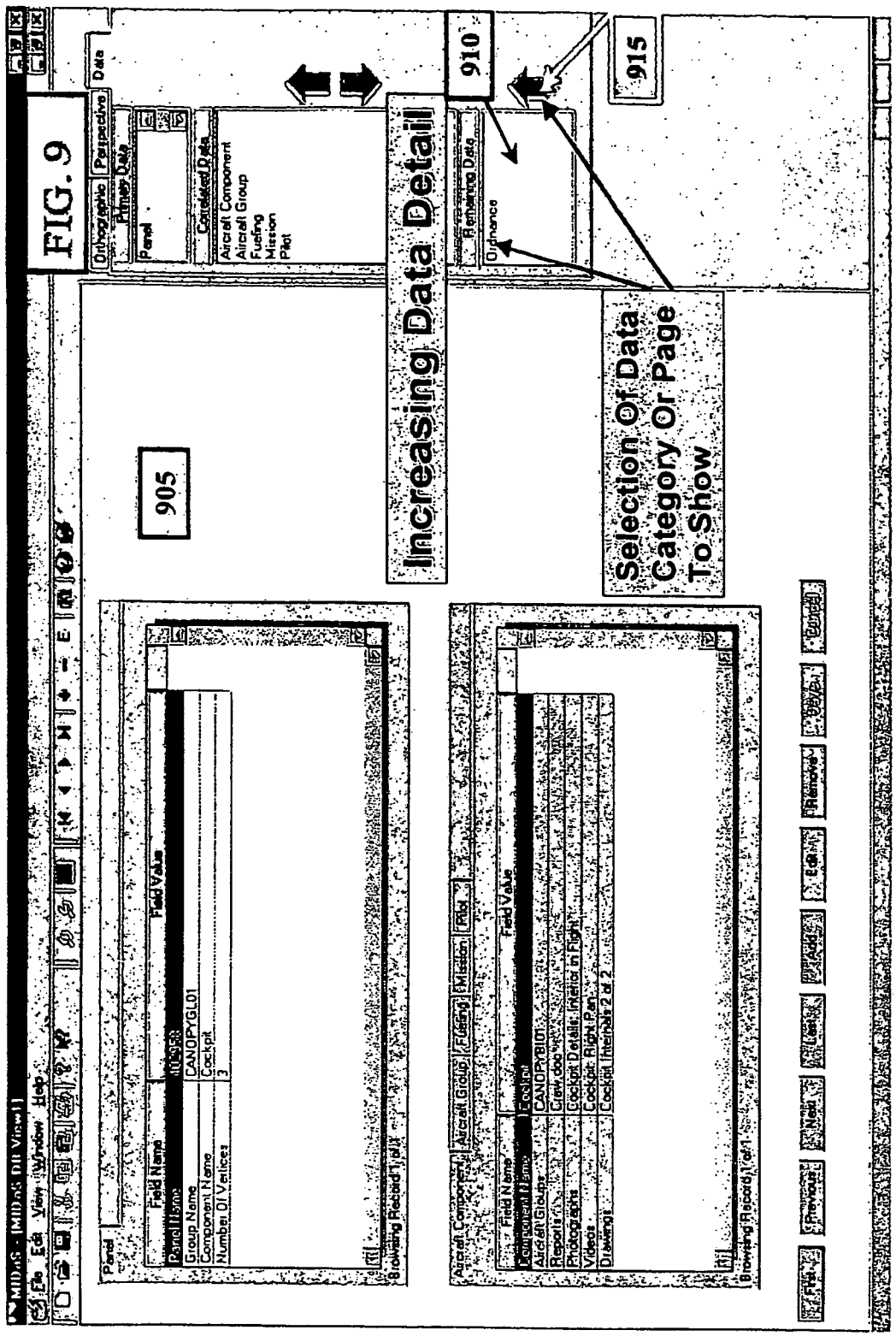
FIG. 9 is an illustration of a data display showing an increasing level of detail.
Figure 10:
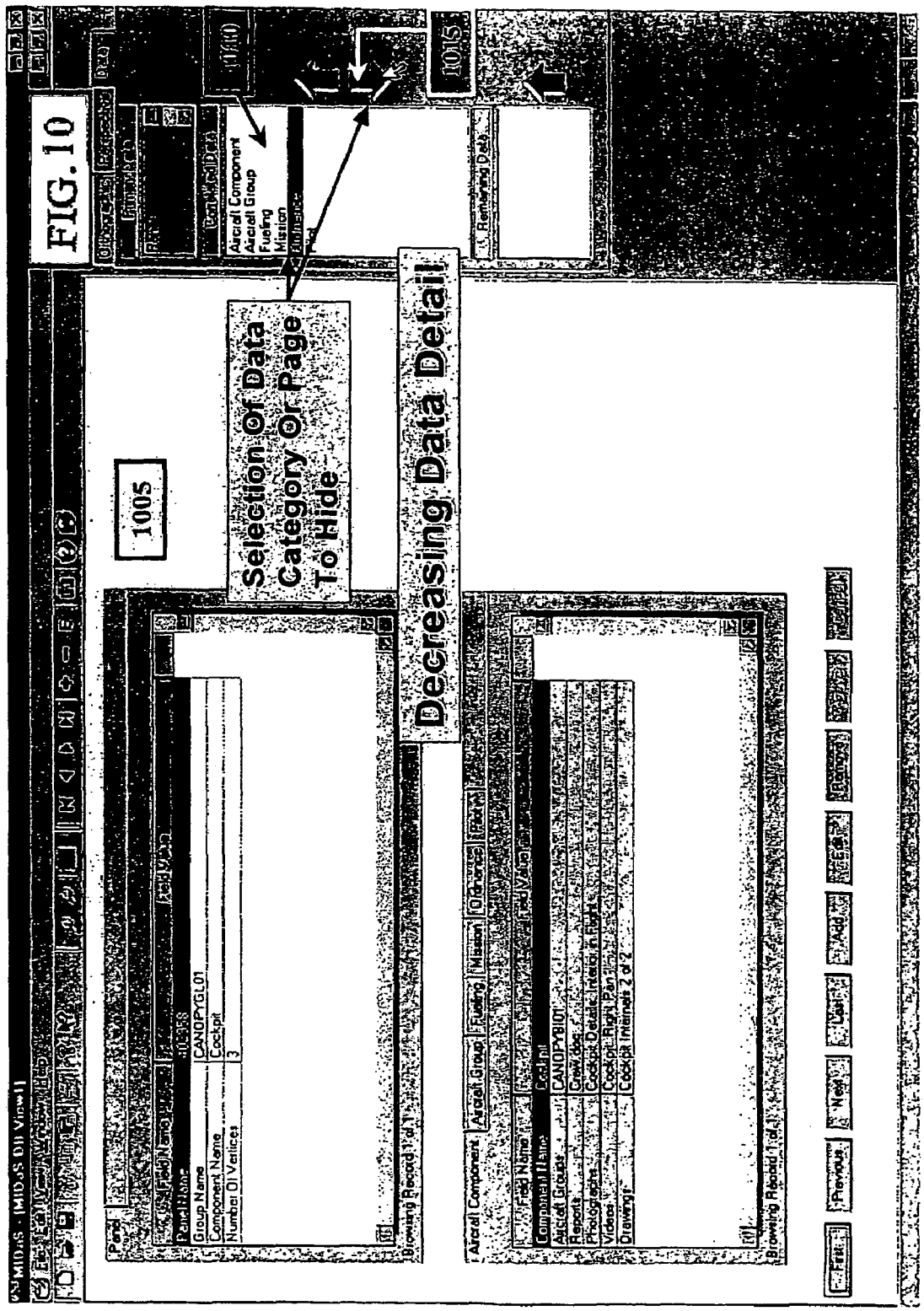
FIG. 10 is an illustration of a data display showing a decreasing level of detail.

The level of detail or number of correlated information pages 815 shown can be increased or decreased by selecting or deselecting the relevant correlated pages 825 for display. On FIG. 9, a data display 905 shows that an increasing data detail can be achieved by selecting a data category or page 910, such as "ORDNANCE". By selecting the data category or page 910 and clicking on the UP arrow 915, "ORDNANCE" appears on display 1005 as a data category or page 1010, as shown on FIG. 10. Conversely, by selecting "ORDNANCE" on the data category or page 1010, and clicking on the DOWN arrow 1015, the data detail can be decreased.

This type of data display is in contrast to the traditional grid-type or multi-column display of information for current or conventional database applications. Users of current database applications can only view or inspect data one dimension or axis/perspective at a time. This piecemeal approach to viewing data is cumbersome when applied to a multi-dimensional database. Also, this current approach does not empower the user to view the problem or situation as a whole. As a result, additional analysis tools are necessitated by conventional database applications, including such analysis tools as online analytical processing (OLAP) tools.

Since MIDaS's data display utilizes data obtained directly from the raw database(s) and is not a processed form of the database (as in the case of OLAP), MIDaS is not encumbered by the limitation of traditional OLAP tools, namely, the inability to update the data in the database directly from the OLAP view. With MIDaS, any update to the data from this view is committed directly to the source database(s). This is a unique feature of MIDaS since it affords capabilities unavailable to conventional OLAP tools or current database applications. This concept is also directly applicable to Internet-based operations on databases. If, however, the conventional multi-column view of all the collated and correlated information is sought, this capability is also available by selecting the multi-column aggregated view option. In this way, users experienced with the OLAP view are able to utilize their familiarity with this type of OLAP data display.

In addition, with all levels of detail made available to the user for viewing at any time, the need for the OLAP feature called drill-across is obviated. Under the OLAP drill-across feature, the user has to select which type of additional data is required and then access it. MIDaS's data display provides this feature more readily by selecting or deselecting the relevant correlated pages 610 for display.

Figure 11:
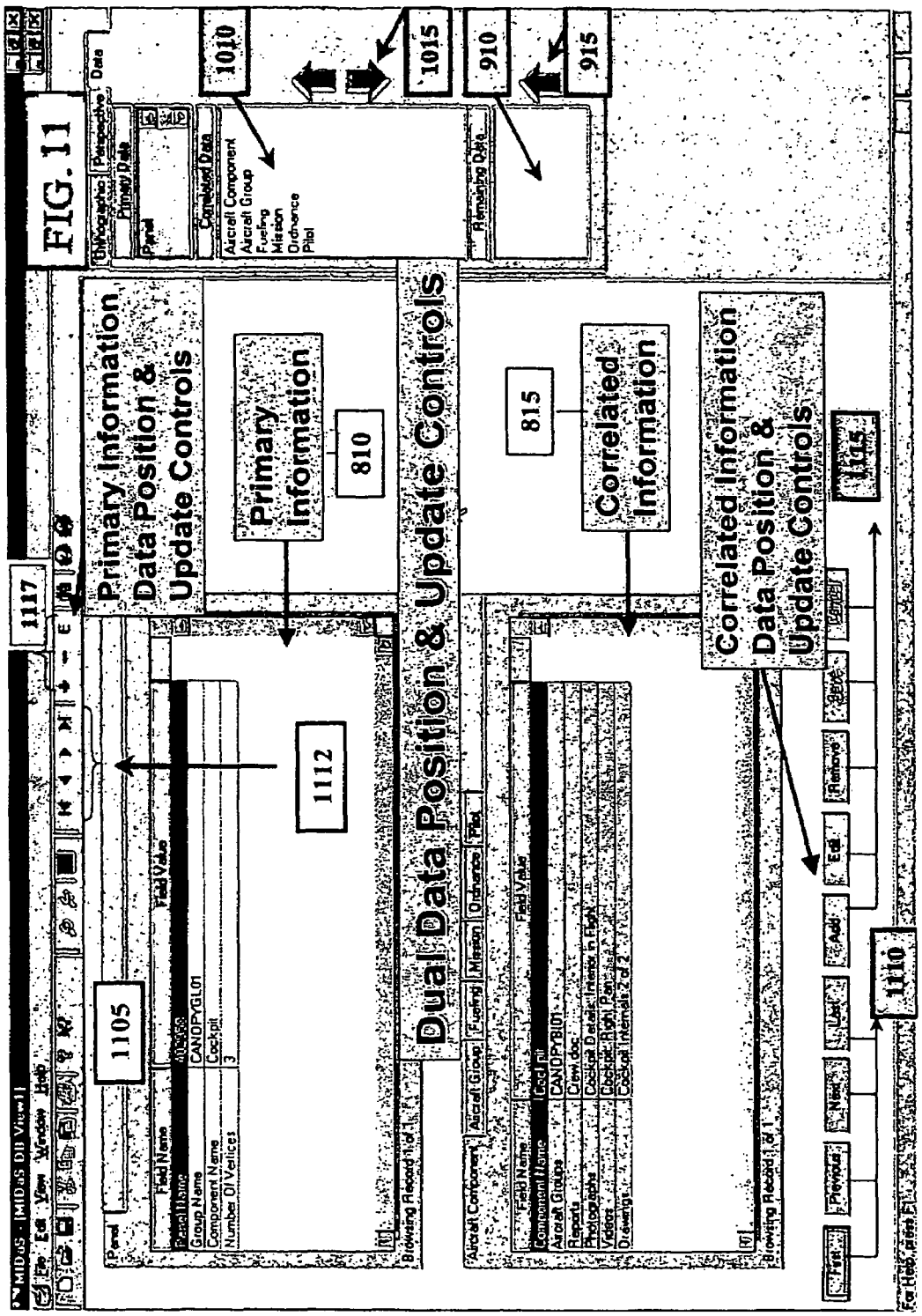
FIG. 11 is an illustration of a data display showing data controls for primary and correlated information.

In one embodiment of the invention, MIDaS's data display 1105 has two sets of scroll controls 1110 and 1112 (first, previous, next, last) and update controls 1115 and 1117 (add, edit, save, cancel) as shown on FIG. 11. The scroll controls 1112 and update controls 1117 are used with the primary information 810, while scroll controls 1110 and update controls 1115 are used with the correlated information 1115.

The primary information scroll controls 1110 change the position of the primary information 810 by advancing or reversing the information. As the primary information 810 is advanced or reversed, the correlated information 815 is automatically re-correlated and re-collated. Similarly, the secondary information scroll controls 1112 allow traversal of records in a one-to-many (one primary information 810 and many correlated information 815) relationship, if it exists.

The primary information update controls 1117 are used similarly. When a new primary information 810 is added and the addition is committed, any correlated information 815 that is relevant to the primary information 810 is automatically correlated and displayed. When a new correlated information 815 record is added, it is automatically linked to the primary information 810 currently displayed. This automation is possible due to the definitions contained in the serialized database interface.

When any update operations are performed, MIDaS uses the same transport mechanisms (i.e. database connection methods and network protocols 655) that were used to display the data as the transport mechanisms for effecting the updates. For example, if the connection was based on OLE-DB, the update operations utilize OLE-DB as the mechanism for carrying out the updates. MIDaS assembles the update command string. In the case of OLE-DB, this is an SQL command string. The command string is then to submitted via the transport mechanism to the source database 605 for execution. To facilitate updates to a multi-user DBMS, the destination record or records are first checked to ascertain that they are not "locked", only then are the updates submitted for execution. MIDaS internally employs a pessimistic locking when the user attempts to add, edit or delete a record. The state of the record (i.e. locked or unlocked) is determined using the relevant connection. Only if the state of the record is unlocked is the user allowed to proceed. If the record is locked, the user is given a message explaining that the selected operation on the record is not currently allowed since it is locked. During the interval between the assembly of the update command string and the execution of the update, MIDaS locks the record. Using this methodology, the use of MIDaS does not interfere with the concurrent operation of the legacy database that it is linked to.

Thus, the present invention for the first time provides a multi-dimensional data display over several databases 605, while providing a dynamic update and multi-dimensional view of "live data," or data stored in the raw databases 605, or even data warehouses. As a result, MIDaS essentially replaces the common uses of OLAP tools in gaining access to data warehouses.

It is also possible for MIDaS to facilitate a rudimentary virtual data warehouse due to the fact that (1) MIDaS connects legacy data sources, and (2) data on the legacy data sources are stored in the serialized data file. The term "virtual" is used because the data warehouse does not physically exist. Instead MIDaS uses the actual data stored in their original data store. Metadata or data about the data (e.g. field names and field data types) stored in the database are, in essence, the same as data on the legacy data sources that are stored in the serialized data file above. As a result the user can assemble a new virtual data warehouse using the serialized file or a set of serialized files that he or she has access to as input or inputs.

The fact that MIDaS also obviates the need for OLAP tools for the analysis of this data also means that MIDaS can analyze this new data warehouse as a live view on live data rather than the warehoused and potentially out of date data.

Figure 12:
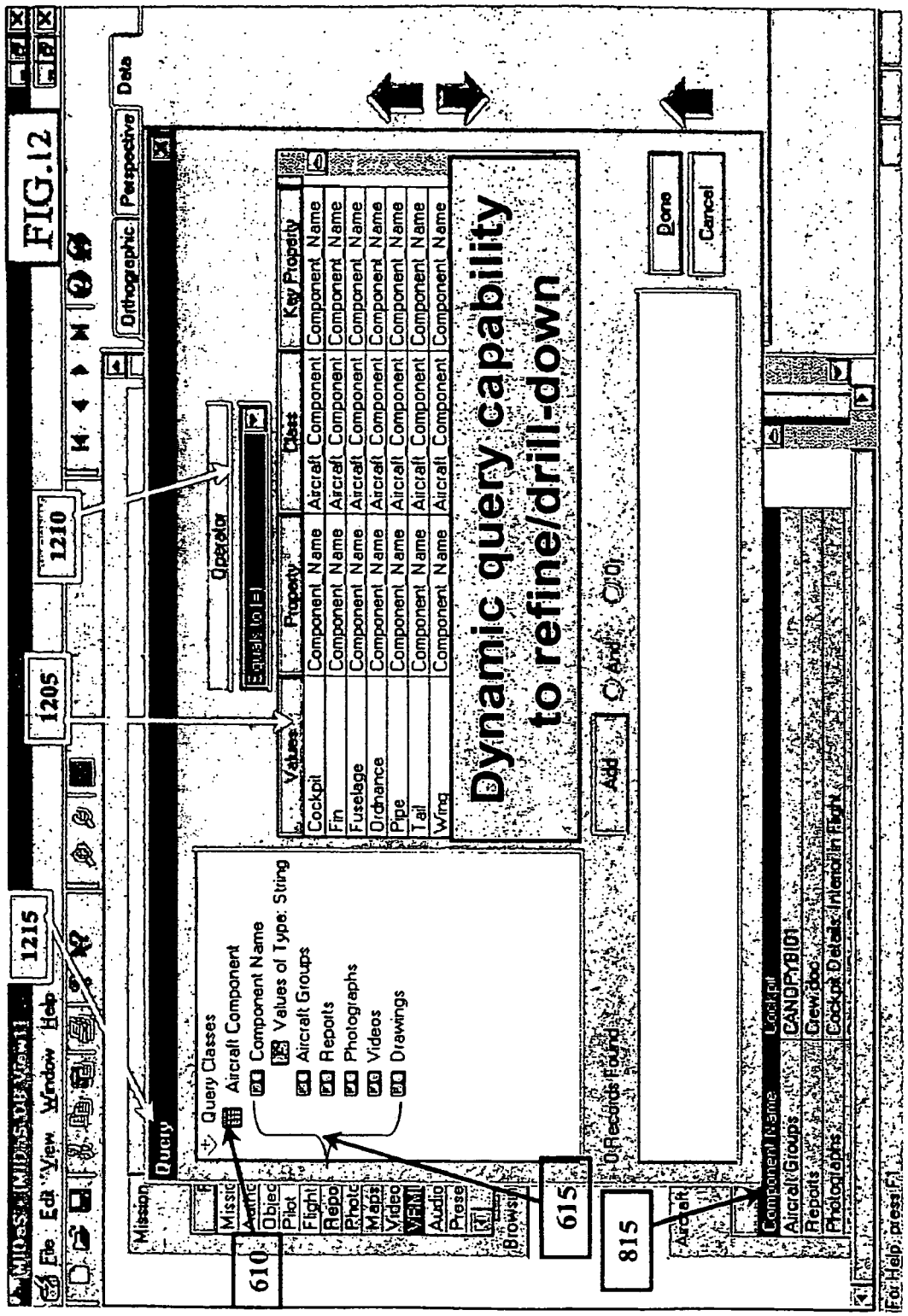
FIG. 12 is an illustration of a dynamic query (drill-down) operation.

MIDaS can also perform dynamic drill-down operations, i.e., dynamic queries for increasing levels of details, as shown on FIG. 12. Utilizing the serialized database interface, the categories or pages 610 are listed and the data elements 615 contained in the page 610 are listed. Values 1205 of the data elements 615 stored in the database are also listed. The user can select the relevant logical operators 1210 (e.g., equal to, greater than, between, etc.) and either select the associated data elements values listed or manually enter the required values. The application then constructs the query 1215 using the relevant syntax. The syntax depends on the type of data source (e.g. SQL for OLE-DB/ODBC data sources or ODQL for Object Database data sources).

The query 1215 is then executed and the results are displayed using the data display defined above. Queries 1215 can also be aggregated (e.g. (Query 1) AND (Query 2) OR (Query 3)). Since these queries 1215 can act on more than a single data source, the user is empowered with a new capability of data analysis over an entire set of databases 605, or even a data warehouse; thereby providing the same functionality as current OLAP tools.

In addition, the drill-down operation and corresponding data view is user-defined at run-time and not at design-time, as is the case with current OLAP tools. Again, since the data displayed is a view of the raw database 605 and not a preprocessed form of the raw database 605, any subsequent update operation on the data displayed is committed directly to the database 605 itself. The user can also increase or decrease the levels of detail by showing or hiding additional correlated information 815. In OLAP terminology, this is called Drill-Through.

In addition, the results of the query 1215 can be graphically represented on the 3-D visualization of the structure by color-coding the relevant components 120 or groups of the structure, according to a user-specified data element 615 from the results of the query 1215. For example, all parts of the structure that have had a structural analysis with an overstress can be highlighted. Further, it is also possible to show levels of overstressing with separate color codes (e.g. components with an overstress value of 1.0 can be shown in blue, while a value of 1.33 can be shown in red, etc.). This feature also allows the user to select discrete values of the defined parameters (such as the overstress value in the example above) for display or subsequent refinement by further specifying additional elements to the active query 1215.

Figure 13:
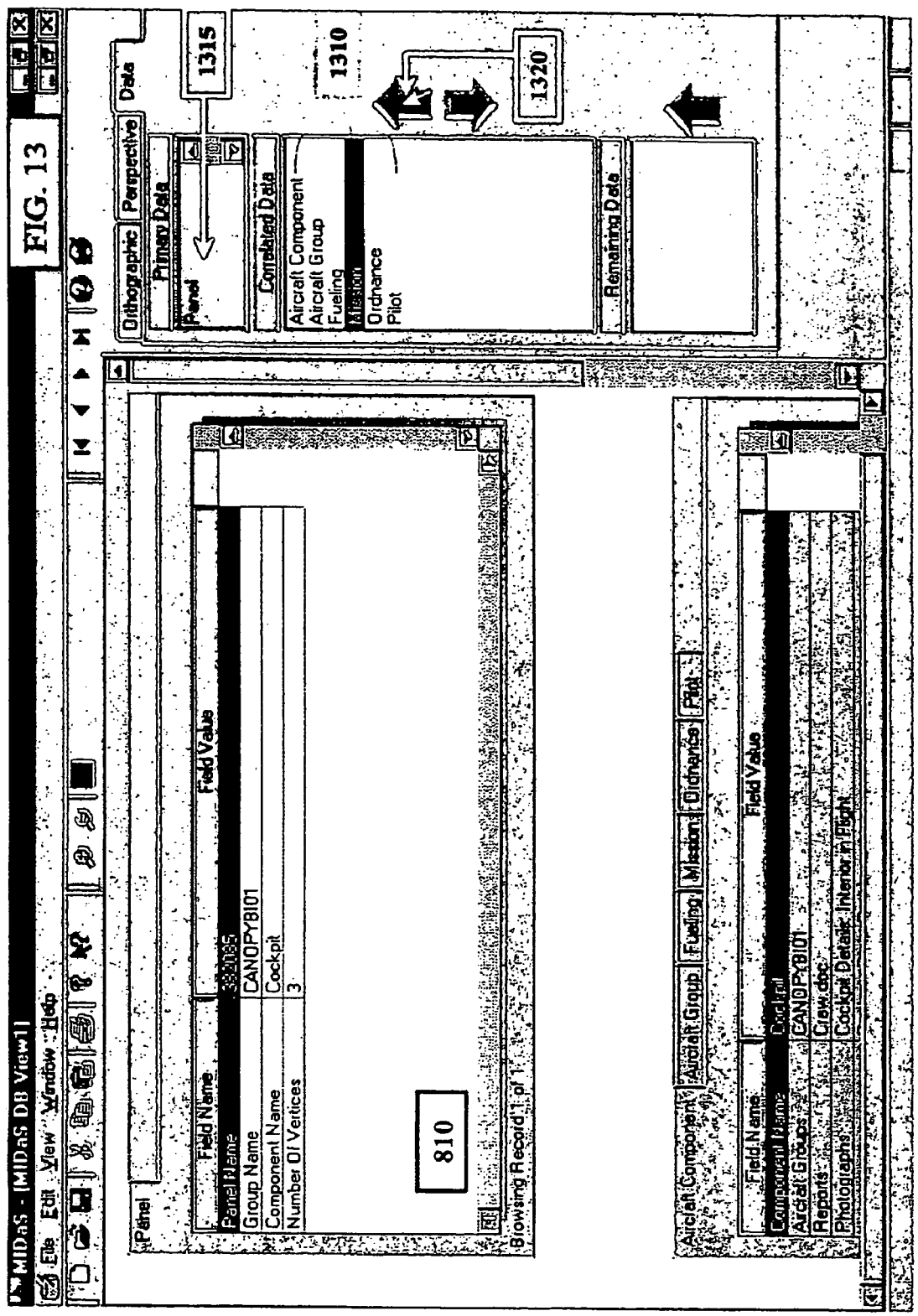
FIGS. 13 and 14 are illustrations of the database pivot feature according to the present invention.
Figure 14:
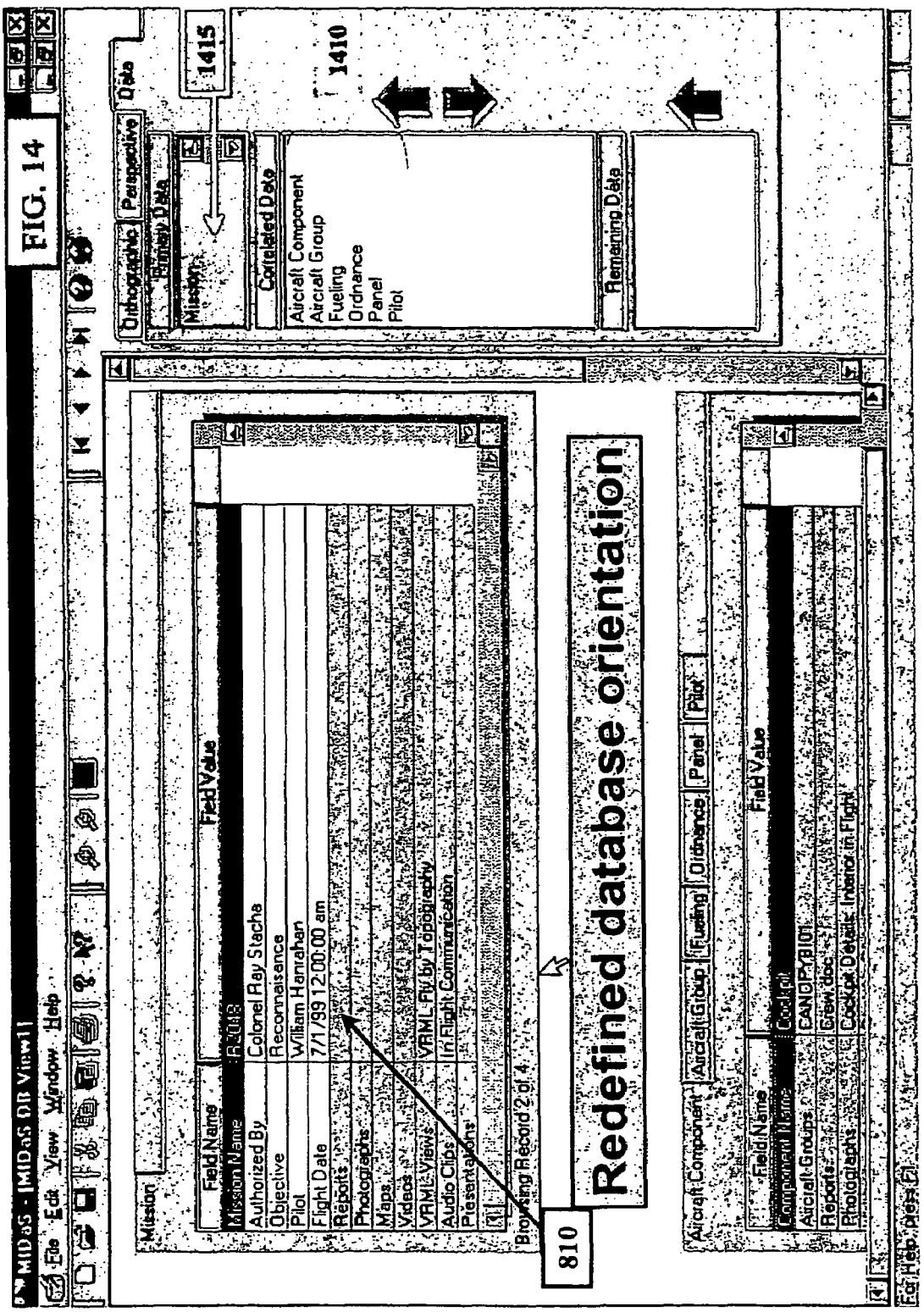

FIGS. 13 and 14 demonstrate a feature for rearranging the primary axis of the database view so that the look of the data can be altered, known as database pivoting. This capability is available to the user by merely redefining the database axis or type of primary information 810. This redefinition operation is performed by simply selecting an entry from the list 1310 of available data pages and clicking to move it to the primary data list 1315 of the view.

For example, on FIG. 13, the value "MISSION" is selected from the list 1310 by highlighting that value, and clicking on the UP arrow 1320. As a result of this selection, on FIG. 14, the primary data list 1415 displays "MISSION," the list 1410 of available to pages is updated to include "PANEL" (which previously appeared in the primary data list 1315), and the database orientation is redefined to display information about "MISSION" in the primary information section 810.

This feature interacts with the Dynamic Query feature by matching the relevant correlation parameters 635 defined in the serialized database interface with the currently active query. Therefore, the pivot is based on the result of the preceding defined query. This feature, due to the fact that the relevant data and its display, its level of detail and the query is user-defined at runtime, is not available to current OLAP tools. Again, the fact that the displayed data can be updated further increases the uniqueness of MIDaS.

Figure 15:
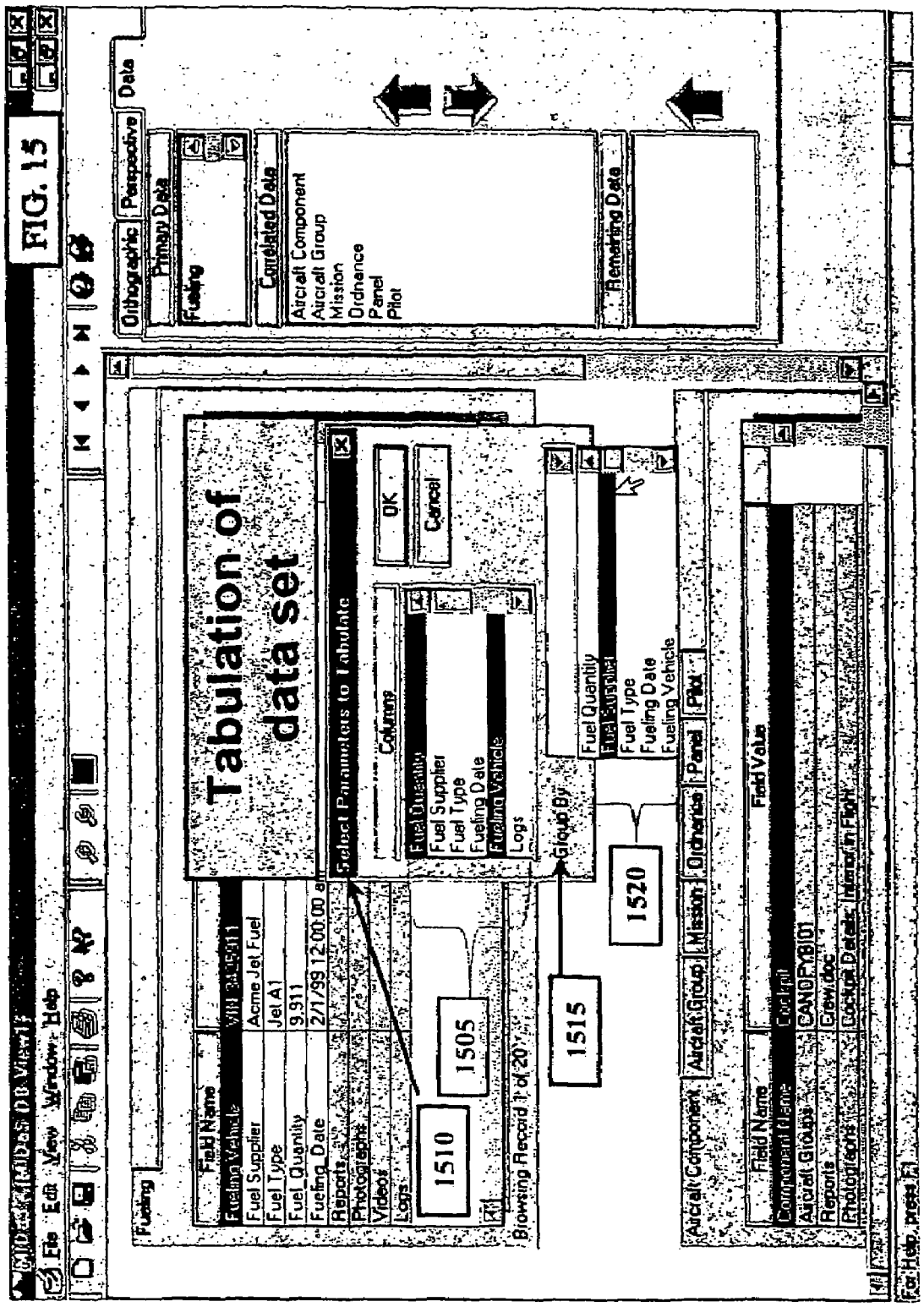
FIGS. 15 and 16 are illustrations of a tabulated trend analysis feature according to the present invention.
Figure 16:
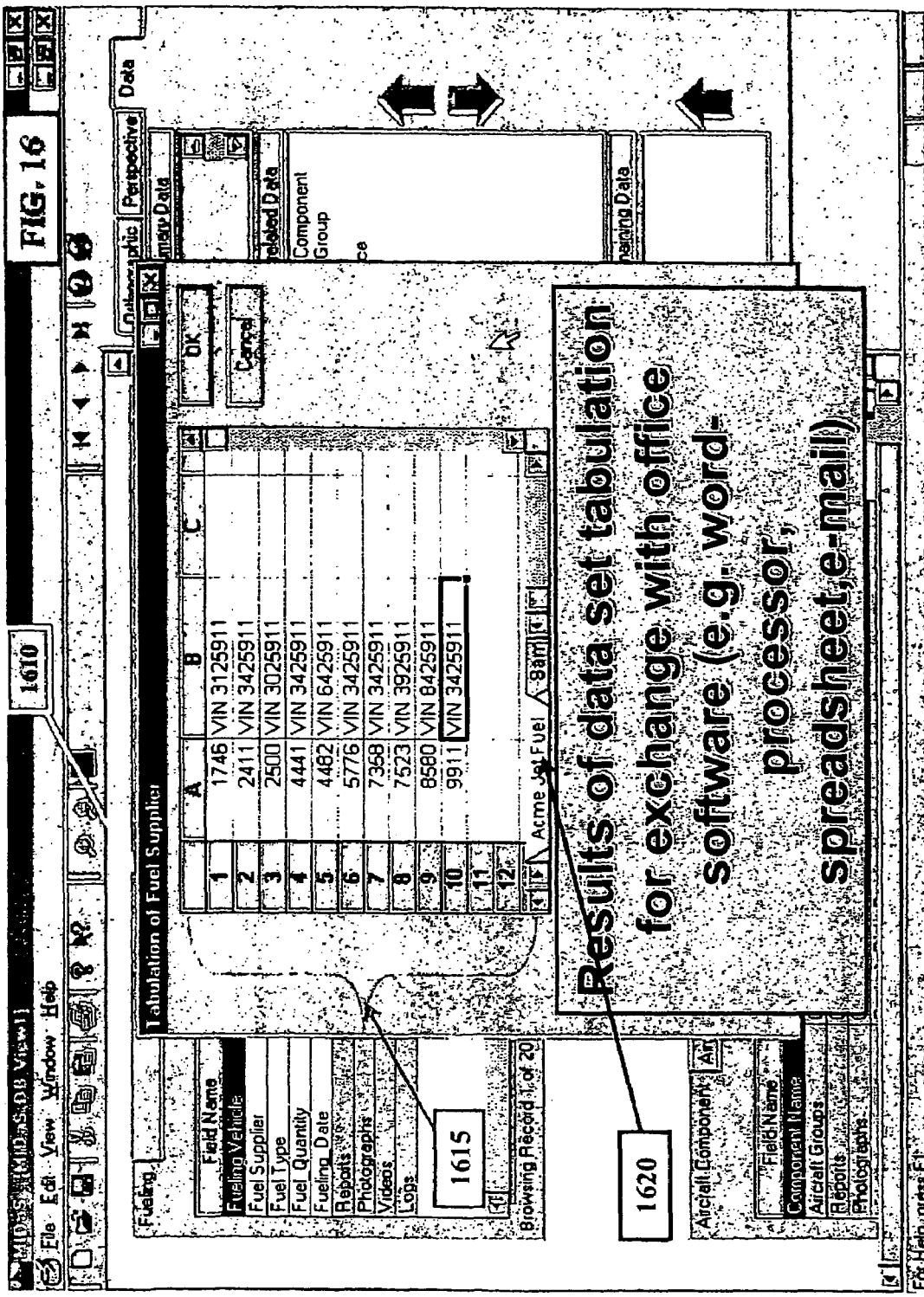

MIDaS also provides graphical and tabulated analysis. In FIG. 15, the user is prompted with the items or data elements 1505 that can be selected, using the Select Parameters to Tabulate window 1510. In this example, the user selects FUEL QUANTITY and FUELING VEHICLE from the Select Parameters to Tabulate window 1510 by highlighting those data elements 1505. In addition, a grouping parameter 1520 can also be selected using the Group By drop-list facility 1515. In this illustration, the user selects FUEL SUPPLIER as a grouping parameter 1520 by highlighting that parameter from the list 1515. This feature allows the user to view multiple conditional trends on the same display. For example, Condition A will generate a separate representation of the trend and will be displayed alongside the trend dependent on Condition B. In this way, comparative trend analysis can be carried out.

The tabulated trend analysis 1610 displays the selected data elements 1505 on a spreadsheet display 1615 that can be exported to an external spreadsheet program for any subsequent processing as desired. The display 1615 is facilitated by an ActiveX control that allows basic spreadsheet operations. The data groupings 1520 selected by the user in the Group By drop-list 1515 are displayed as separate worksheets 1620 within the spreadsheet display 1615.

Figure 17:
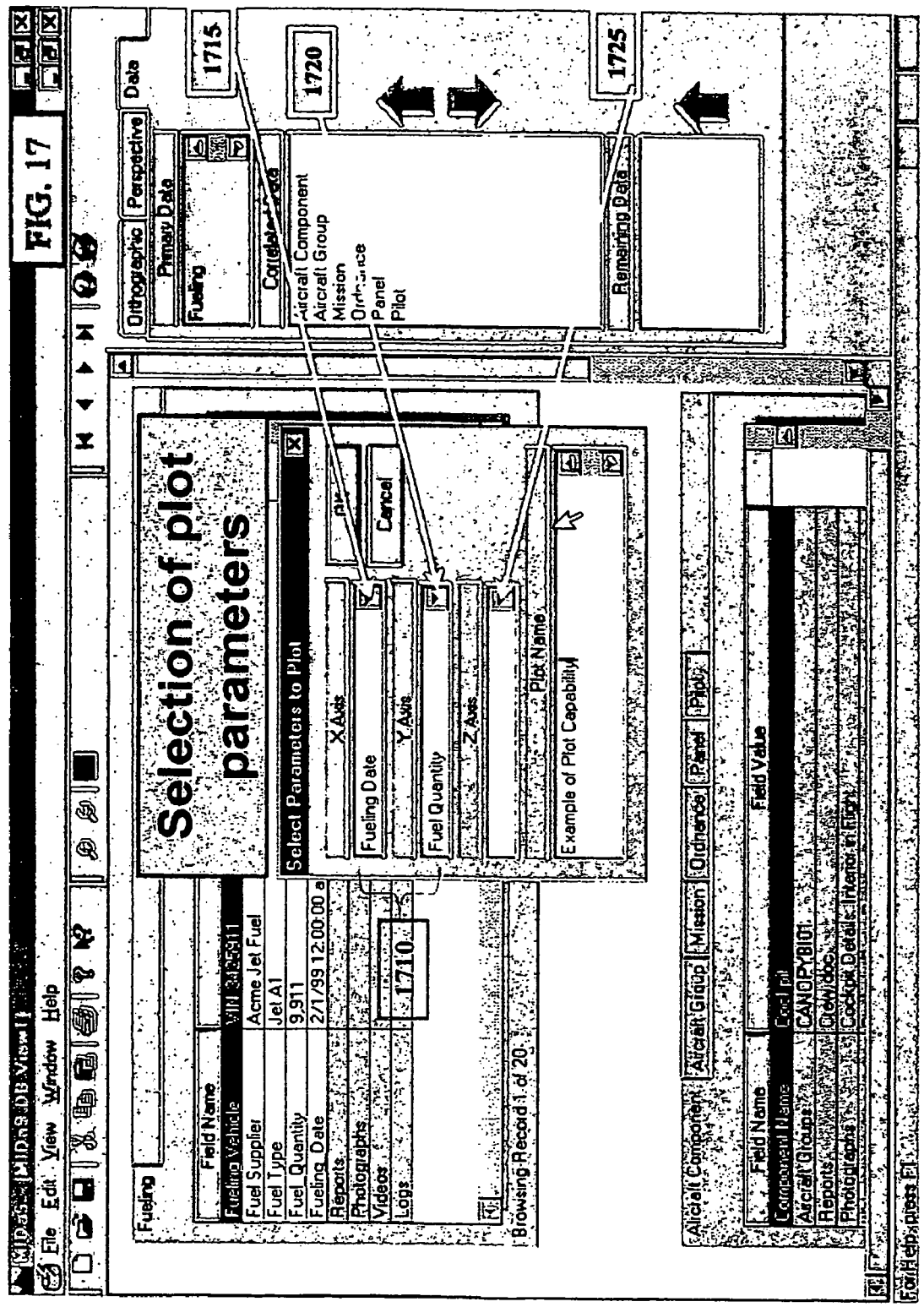
FIGS. 17 and 18 are illustrations of a graphical trend analysis feature according to the present invention.
Figure 18:
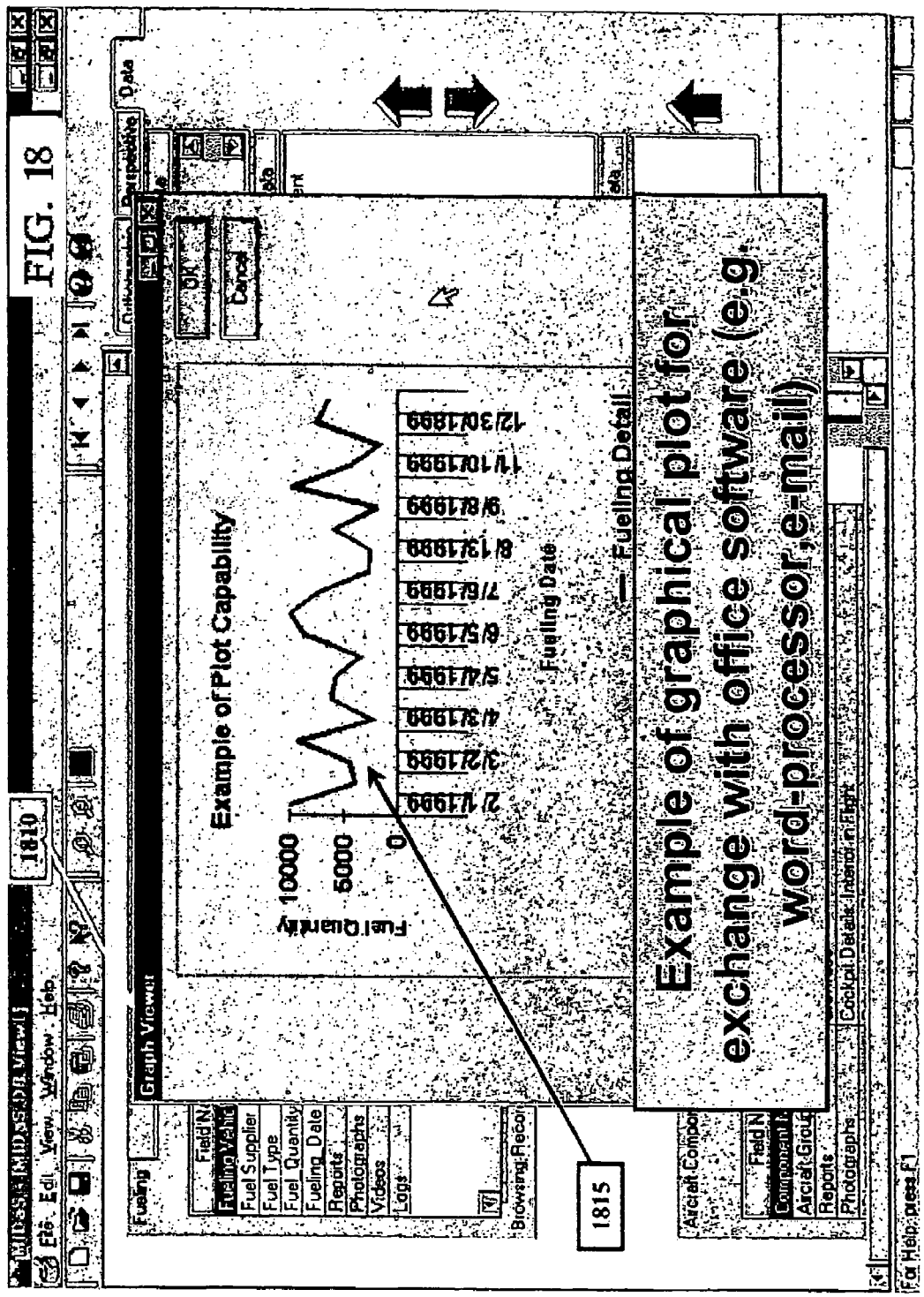

The graphical trend analysis feature shown on FIGS. 17 and 18 plots the data elements 1710 selected on either a two- or three-dimensional plot for comparison. Drop lists 1715, 1720, and 1725 for the X-; Y- and Z-axes, respectively, are provided to allow the selection of data elements 1710. The drop lists 1715, 1720, and 1725 are populated at runtime based on the data elements 1710 contained in the relevant page definition in the serialized database interface. This feature allows the visualization of the trend using a graphical plot such as that shown on FIG. 18. The graph viewer 1810 displays the graph 1815 based on the data elements 1710 that were previously selected. The graph viewer is facilitated by an ActiveX control that allows cut and paste operations between applications such as word processors or e-mail software.

Figure 19:
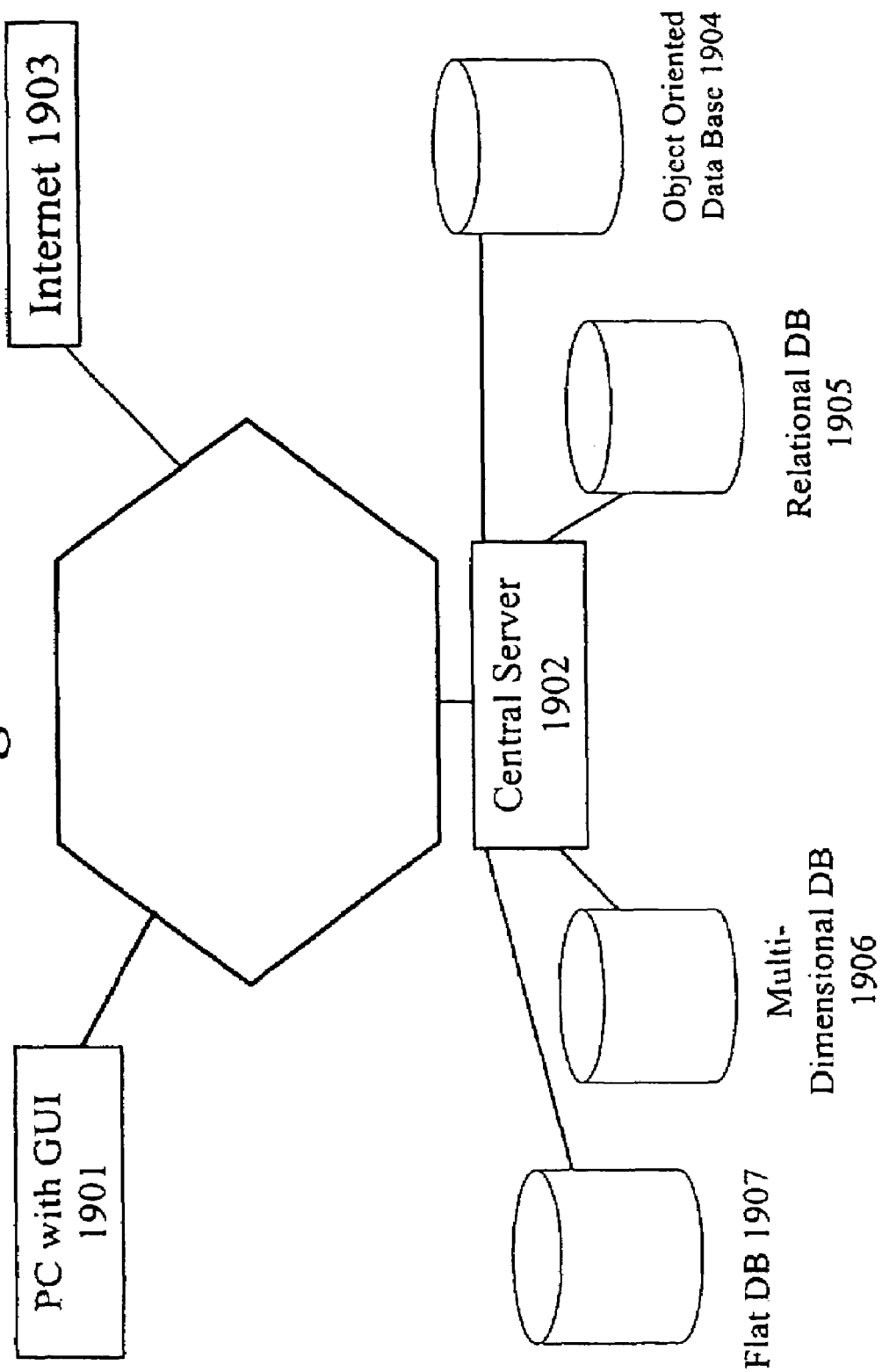
FIG. 19 is an illustration of an embodiment of the invention showing a server that has direct access to a plurality of local databases.

FIG. 19 depicts an embodiment of the present invention in which a user using a PC with a GUI 1901 gains access to a central server 1902 through the Internet 1903. The central server 1902 is connected to a plurality of source databases, such as an object-oriented database 1904, a relational database 1905, a multi-dimensional database 1906, and a flat database 1907. When a user submits a query using the PC with a GUI 1901, the query is transmitted to the central server 1902. The response to the query is transmitted back to the PC with a GUI 1901. In this embodiment, the central server 1902 has local access to each of the plurality of source databases that provide data into the OLAP data cube. When the OLAP cube is generated, the central server 1902 gathers data from each applicable source database 1904 through 1907.

Figure 20:
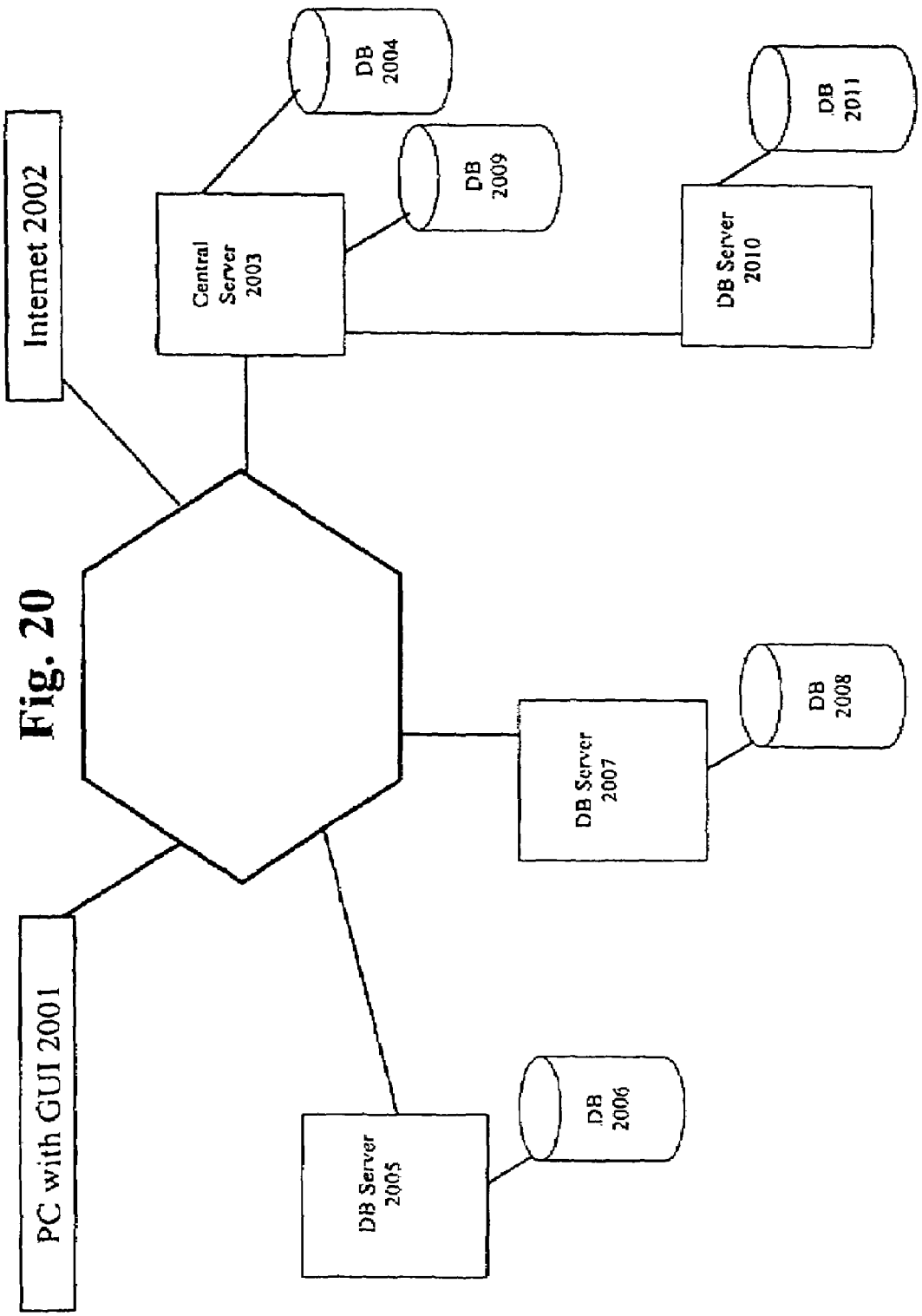
FIG. 20 is an illustration of an embodiment of the invention showing a server and a plurality of databases remote from the server.

FIG. 20 is an embodiment of the present invention in which a PC with a GUI 2001 is connected to a central server 2003 through the Internet 2002, and the central server 2003 has remote access to at least one source database, such as database servers 2005 and 2007, which in turn have access to databases 2006 and 2008. At the same time, the central server 2003 may also have local access to other source databases such as database 2004, database 2009, and database server 2010, which in turn, has access to database 2011. When the OLAP cube is generated, the central server 2003 gathers data from each applicable source database 2003 through 2011. If data are needed from the remote source databases, such as database server 2005, the central server gathers the necessary data from the remote source databases through data transmission via the Internet 2002.

Figure 21:
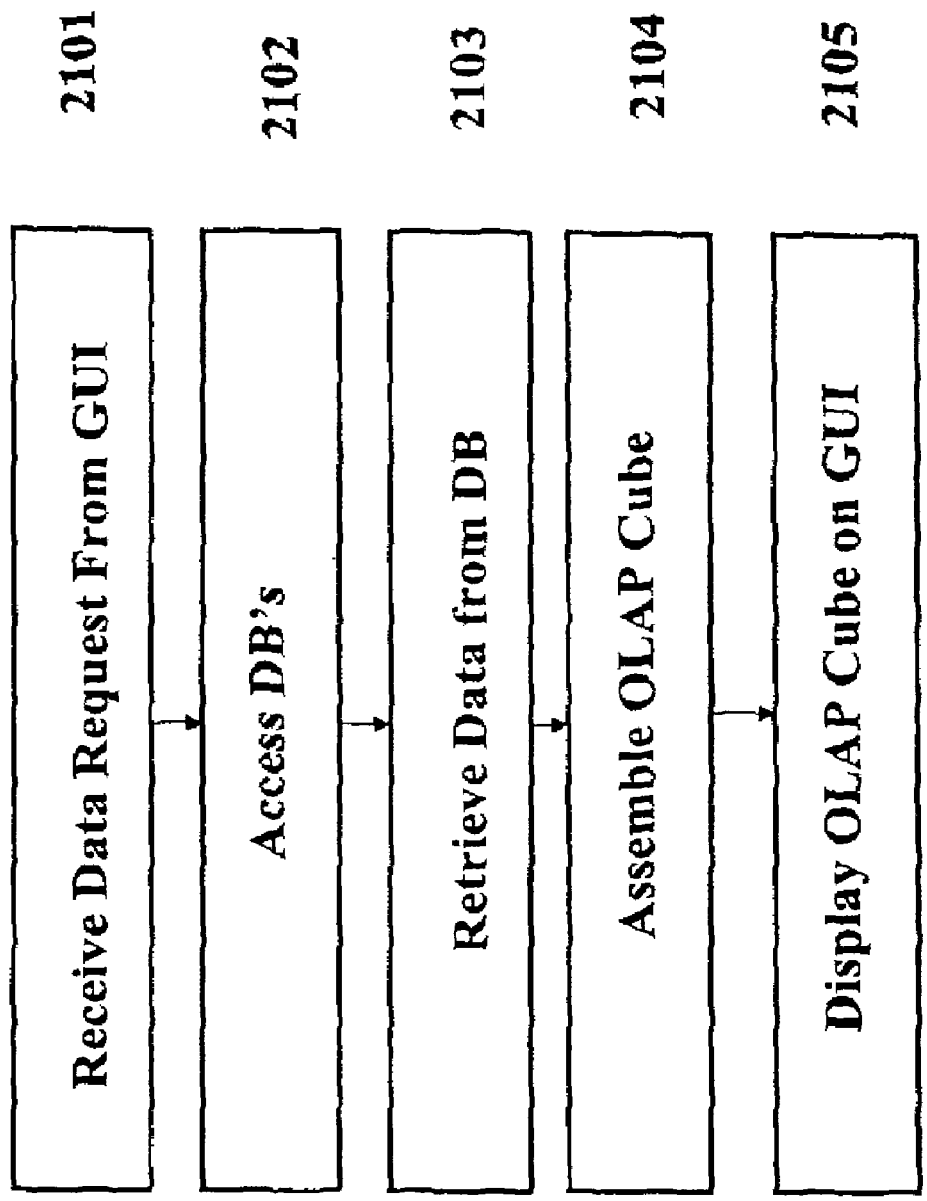
FIG. 21 is a flowchart showing an embodiment of the invention for retrieving data based on a data request.

FIG. 21 depicts a method for processing a data query received from a user, such as one using a PC with a GUI 2001. The data request is received from the GUI in step 2101. Access to the databases is established in step 2102. Once the databases are accessible, data are retrieved from the databases in step 2103. The data are used to assemble the OLAP cube in step 2104. The OLAP cube is then displayed using the GUI in step 2105.

Figure 22:
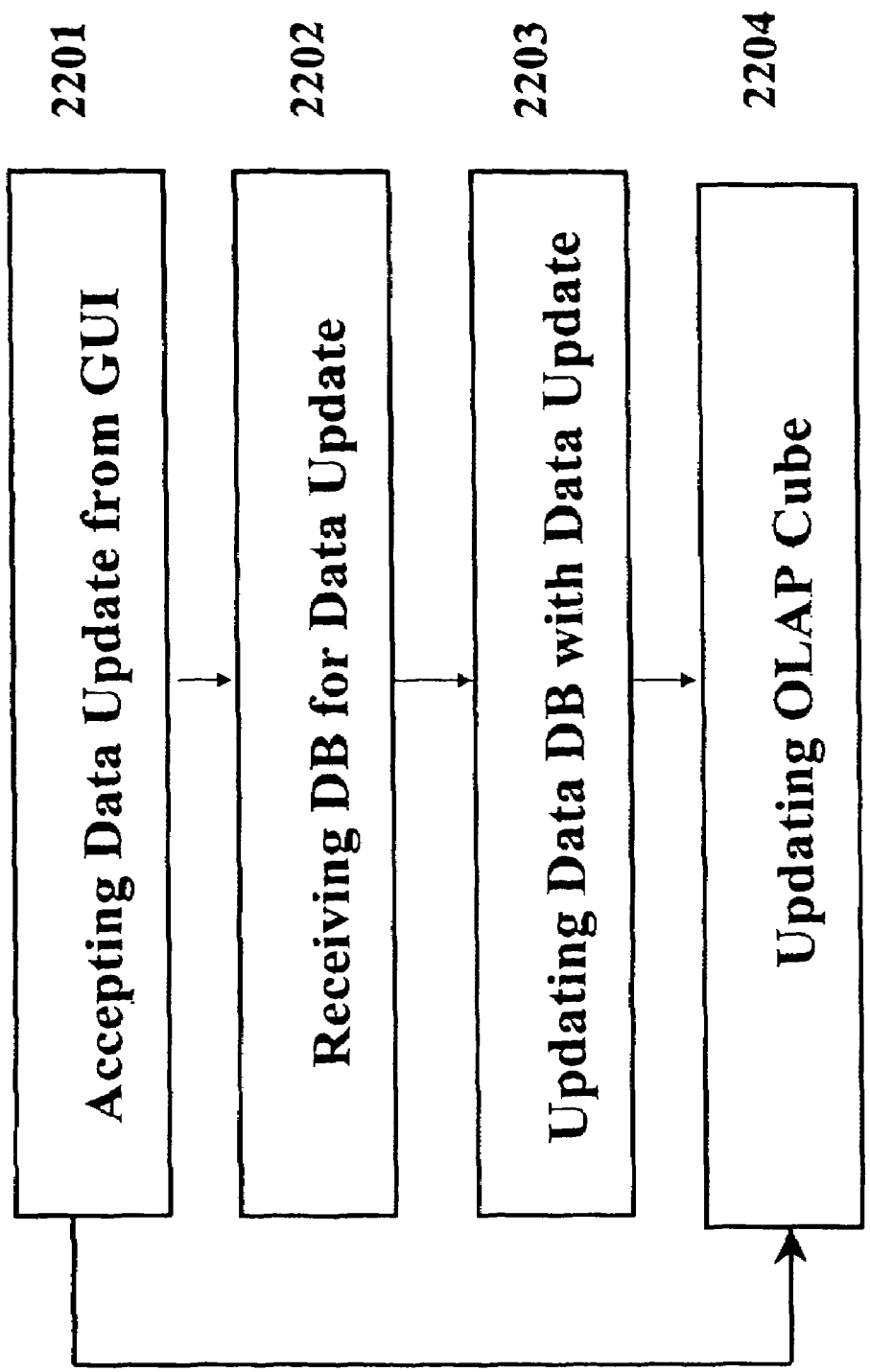
FIG. 22 is a flowchart showing an embodiment of the invention for updating data.

FIG. 22 depicts a method for updating data according to an embodiment of the present invention. The data update request is received from the GUI in step 2201. The data update request initiates a change to the data in the OLAP cube in step 2204, and in addition, also initiates a change to the data in the source databases. To change the data in the source databases, access to the databases is established in step 2202. Once the databases are accessible for data updates, the data is updated in step 2203.

Description of Technology Employed in MIDaS, a Preferred Embodiment

In one embodiment, the MIDaS product, the software is written as an object-oriented application using Microsoft Visual C++, from Microsoft Corporation of Redmond, Wash. This approach to software development allows for maximum adaptability to different structures, because by using object-oriented languages, structures can share a common, generic description in terms of structural components, component connectivity, and analyses and inspection requirements. In addition, the same object-oriented paradigm (class definitions and program structure) can be applied to different object-oriented languages. Indeed, the same program can be re-written in languages such as Java. MIDaS may be ported to a combined Java and XML (Extensible Markup Language) version.

In the MIDaS embodiments, to facilitate porting of the data and to keep up with changes and improvements in the display and exchange of information and communication standards, third party Active X controls is used extensively for the display and exchange of data. The software utilizes Microsoft Media Player from Microsoft Corporation, Protoview ActiveX Component Suite (ProtoView Development Corporation of Cranbury, N.J.), Visual Components Suite (Tidestone Technologies Inc. of Overland Park, Kans., formerly Visual Components, Inc.), Wang Imaging Controls (Developed for Microsoft Corporation by Wang Laboratories Inc. of Lowell, Mass.), Non-Rectangle Arrow Control (ASP Corporation and included in Microsoft Visual C++ 4.1), and COMcache Xplorer Control Set (COMcache).

Where the production of reports in document form is required, a third party reporting tool can be utilized, such as Seagate Crystal Reports from Seagate Software, a subsidiary of Seagate Technology of Scotts Valley, Calif.

In the MIDaS embodiment, an Internet interface, developed using Microsoft Visual C++ and Microsoft Internet Explorer 5.0, facilitates the lookup of relevant data such as engineering codes of practice not stored directly in the databases. In addition, this interface is used to report the status of order replacement parts, or of any associated equipment.

While the present invention has been described in connection with what are presently considered to be the most practical and preferred embodiments, it is to be understood that the invention is not limited to the disclosed embodiments. On the contrary, the present invention is intended to cover various modifications and equivalent arrangements included within the spirit and scope of the appended claims.

What is claimed is:

1. A method executed by a programmable apparatus, comprising:
   a. receiving with a computer a data retrieval request to form an OLAP cube from a graphical user interface (GUI) on a programmable user display device, b. in response to the retrieval request to form the OLAP cube, accessing with the computer a plurality of disparate digital databases and retrieving with the computer requested data from such databases, c. viewing the OLAP cube formed from the retrieved data using the GUI, wherein the retrieved data is accessed dynamically on demand directly from the disparate digital databases, d. accepting through the GUI a user update of specific data in the OLAP cube, e. accessing a database relevant to the specific data, and updating that database dynamically on demand with the specific data, and f. dynamically updating the OLAP CUBE data displayed on the GUI with the specific data.

2. The method of claim 1 further comprising:

g. providing a plurality of access codes, each access code corresponding to a number of the disparate databases that may be accessed with the access code, h. assigning a user at least one of the access codes, and i. receiving and responding to a data request from the user if the access code to which the user is assigned authorizes access to the disparate databases relevant to the requested data.

3. A data storage medium containing instructions which, when executed, cause a computational device to perform a method comprising:

a. receiving with a computer a data retrieval request to form an OLAP cube from a graphical user interface (GUI) on a programmable user display device, b. in response to the retrieval request to form an OLAP cube, accessing with the computer a plurality of disparate digital databases and retrieving with the computer requested data from such databases, c. viewing the OLAP cube formed from the retrieved data using the GUI, wherein the retrieved data is accessed dynamically on demand directly from the disparate digital databases, d. accepting through the GUI a user update of specific data in the OLAP cube, e. accessing a database relevant to the specific data, and updating that database dynamically on demand with the specific data, and f. dynamically updating the OLAP cube data displayed on the GUI with the specific data.

4. The data storage medium of claim 3, the method further comprising:

g. providing access codes, each of the access codes corresponding to a number of the disparate databases that may be accessed with the access codes, h. assigning a user at least one of the access codes, and i. receiving and responding to a data request from the user if the access code to which the user is assigned authorizes access to the disparate databases relevant to the requested data.

* * * * *

INTER PARTES REEXAMINATION CERTIFICATE (1229th)
United States Patent
Vasudevan

(10) Number: US 7,720,861 C1
(45) Certificate Issued: *Feb. 9, 2016

(54) MULTIMEDIA INSPECTION DATABASE SYSTEM (MIDAS) FOR DYNAMIC RUN-TIME DATA EVALUATION

(75) Inventor: Mark P Vasudevan, Winston-Salem, NC (US)

(73) Assignee: Vasudevan Software Inc.

Reexamination Request:
No. 95/000,697, Sep. 14, 2012

Reexamination Certificate for:
Patent No.: 7,720,861
Issued: May 18, 2010
Appl. No.: 11/592,447
Filed: Nov. 3, 2006

(*) Notice: This patent is subject to a terminal disclaimer.

Related U.S. Application Data

(63) Continuation of application No. 10/911,368, filed on Aug. 4, 2004, now Pat. No. 7,167,864, which is a continuation of application No. 09/903,506, filed on Jul. 13, 2001, now Pat. No. 6,877,006.

(60) Provisional application No. 60/219,186, filed on Jul. 19, 2000.

(51) Int. Cl.
G06F 7/00 (2006.01)
G06F 17/30 (2006.01)

(52) U.S. Cl.
CPC .... *G06F 17/30061* (2013.01); *G06F 17/30017* (2013.01); *G06F 17/30592* (2013.01); *Y10S 707/99931* (2013.01); *Y10S 707/99943* (2013.01); *Y10S 707/99945* (2013.01)

(58) Field of Classification Search
None
See application file for complete search history.

(56) References Cited

To view the complete listing of prior art documents cited during the proceeding for Reexamination Control Number 95/000,697, please refer to the USPTO's public Patent Application Information Retrieval (PAIR) system under the Display References tab.

*Primary Examiner* — Christopher E. Lee

(57) ABSTRACT

An object-oriented system provides a comprehensive and integrated tool to manage, operate, analyze and inspect structures by providing 3-D visualization of the structures, a database interface, connectivity with one or more databases, a data display and analysis capabilities. The structural model is stored as an object-oriented, serialized file as a series of objects, including primitives, coordinates, object names, group names and other object identifiers. The system integrates various types of data, including tabulated textual data, annotated engineering drawings, photographic records, graphical plots, audio and videotaped records, from different tables and databases. Data are displayed to the user based on queries that the user submits to the system, which queries are evaluated at run-time. As a result, the user achieves unparalleled flexibility in data analysis and evaluation.

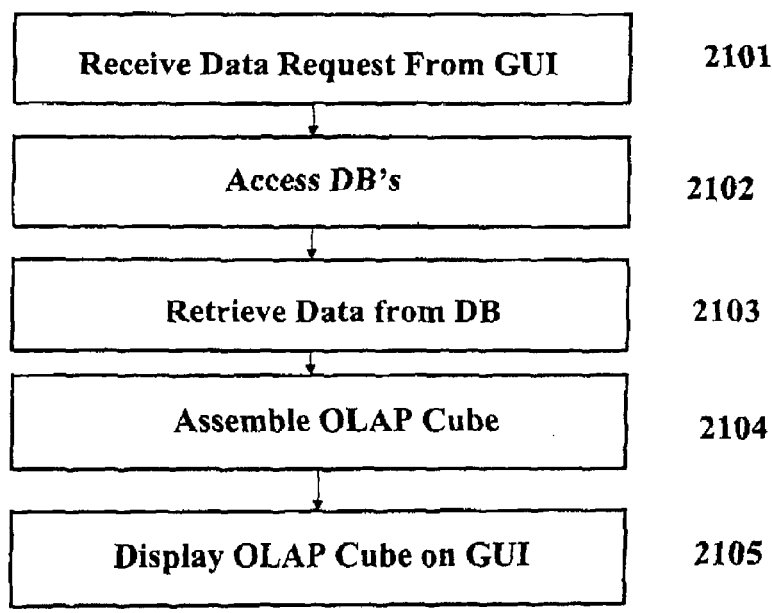

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-4 are cancelled.

\* \* \* \* \*